(12) United States Patent
Kurasawa et al.

(10) Patent No.: US 10,572,062 B2
(45) Date of Patent: *Feb. 25, 2020

(54) DISPLAY DEVICE AND TOUCH DETECTION METHOD OF DISPLAY DEVICE

(71) Applicant: Japan Display Inc., Tokyo (JP)

(72) Inventors: Hayato Kurasawa, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,072

(22) Filed: Apr. 16, 2019

(65) Prior Publication Data

US 2019/0243507 A1 Aug. 8, 2019

Related U.S. Application Data

(63) Continuation of application No. 16/055,709, filed on Aug. 6, 2018, now Pat. No. 10,303,291, which is a
(Continued)

(30) Foreign Application Priority Data

Mar. 10, 2016 (JP) .................................. 2016-046910

(51) Int. Cl.
*G06F 3/041* (2006.01)
*G02F 1/1343* (2006.01)
(Continued)

(52) U.S. Cl.
CPC ........ *G06F 3/0416* (2013.01); *G02F 1/13338* (2013.01); *G02F 1/134309* (2013.01);
(Continued)

(58) Field of Classification Search
CPC ...... G06F 3/041; G06F 3/0412; G06F 3/0416; G06F 3/044; G06F 2203/04107;
(Continued)

(56) References Cited

U.S. PATENT DOCUMENTS

2012/0038585 A1 2/2012 Kim
2013/0286300 A1* 10/2013 Lee ...................... G06F 3/0412
349/12

(Continued)

FOREIGN PATENT DOCUMENTS

JP 2000-066837 A 3/2000
JP 2015-072686 A 4/2015

OTHER PUBLICATIONS

Japanese Office Action dated Oct. 29, 2019 for corresponding Japanese Application No. 2016-046910.

*Primary Examiner* — Nathan Danielsen
(74) *Attorney, Agent, or Firm* — Michael Best & Friedrich LLP

(57) ABSTRACT

According to one embodiment, a display device includes a plurality of gate lines, a plurality of data lines intersecting with the gate lines, a plurality of pixel electrodes, and a sensor drive controller which includes a plurality of common electrodes facing the pixel electrodes and detects a touch by controlling the common electrodes. The sensor drive controller selects at least one of the common electrodes, and supplies a sensor signal to the selected common electrode to set the selected common electrode to a sensing state. The sensor drive controller sets at least the common electrode adjacent to the common electrode set to the sensing state to a guard state and sets the other common electrodes to a floating state.

8 Claims, 18 Drawing Sheets

Related U.S. Application Data continuation of application No. 15/395,097, filed on Dec. 30, 2016, now Pat. No. 10,067,601.

(51) Int. Cl.
    *G02F 1/1362*     (2006.01)
    *G06F 3/044*     (2006.01)
    *G02F 1/1333*     (2006.01)

(52) U.S. Cl.
    CPC ........ *G02F 1/136286* (2013.01); *G06F 3/044* (2013.01); *G06F 3/0412* (2013.01); *G02F 2001/134372* (2013.01); *G02F 2201/121* (2013.01); *G02F 2201/123* (2013.01); *G06F 2203/04107* (2013.01)

(58) Field of Classification Search
    CPC ............... G02F 1/13338; G02F 1/1343; G02F 1/134309; G02F 1/136286; G02F 2001/134318; G02F 2001/134372; G02F 2001/13629; G02F 2001/136295; G02F 2201/121; G02F 2201/123
    See application file for complete search history.

(56) References Cited

U.S. PATENT DOCUMENTS

| | | |
|---|---|---|
| 2013/0342498 A1 | 12/2013 | Kim et al. |
| 2014/0049486 A1 | 2/2014 | Kim et al. |
| 2014/0049508 A1 | 2/2014 | Kim et al. |
| 2014/0210764 A1 | 7/2014 | Shepelev |
| 2015/0042600 A1 | 2/2015 | Lukanc et al. |
| 2015/0091843 A1 | 4/2015 | Ludden |
| 2016/0291779 A1 | 10/2016 | Lu et al. |

* cited by examiner

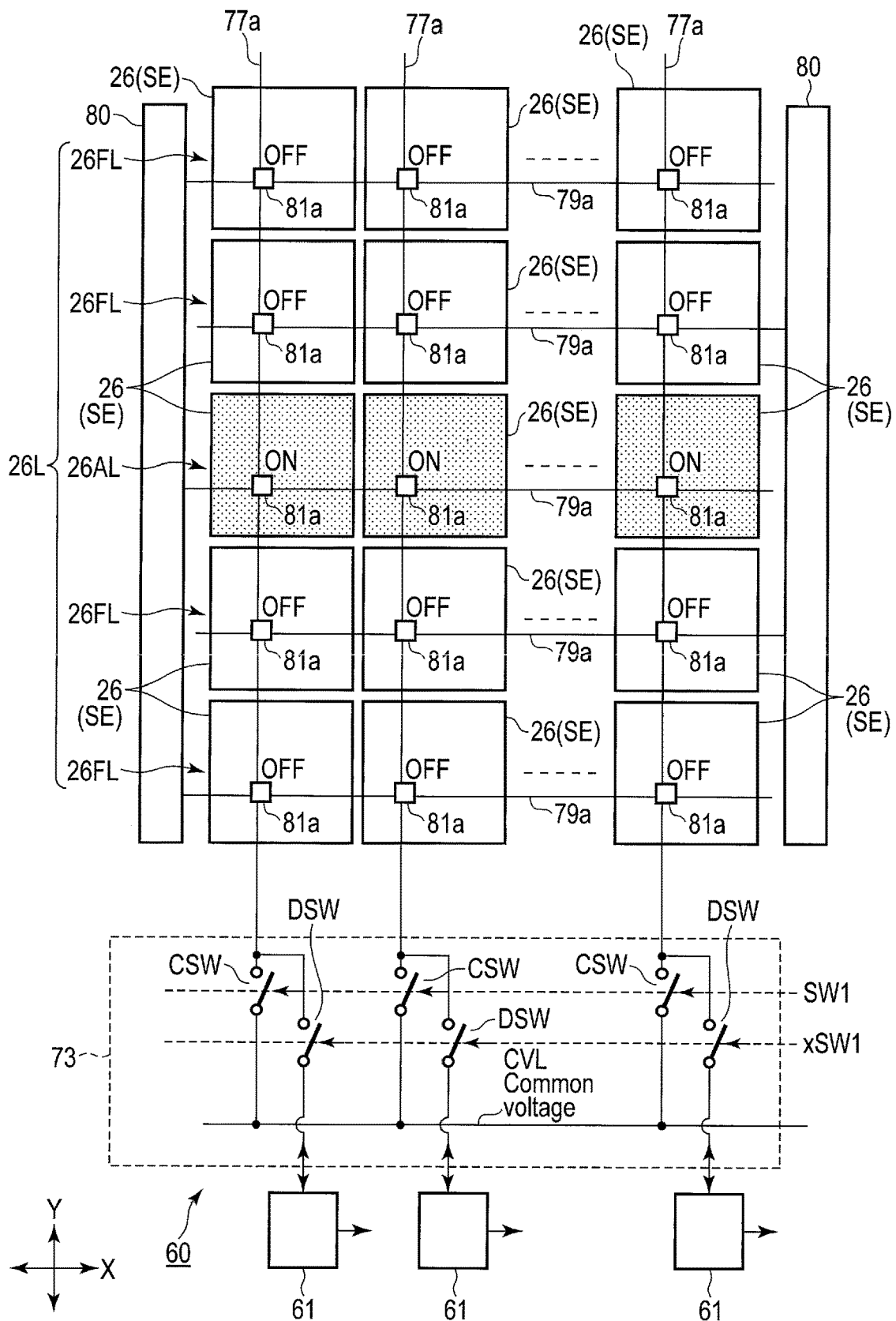
F I G. 10

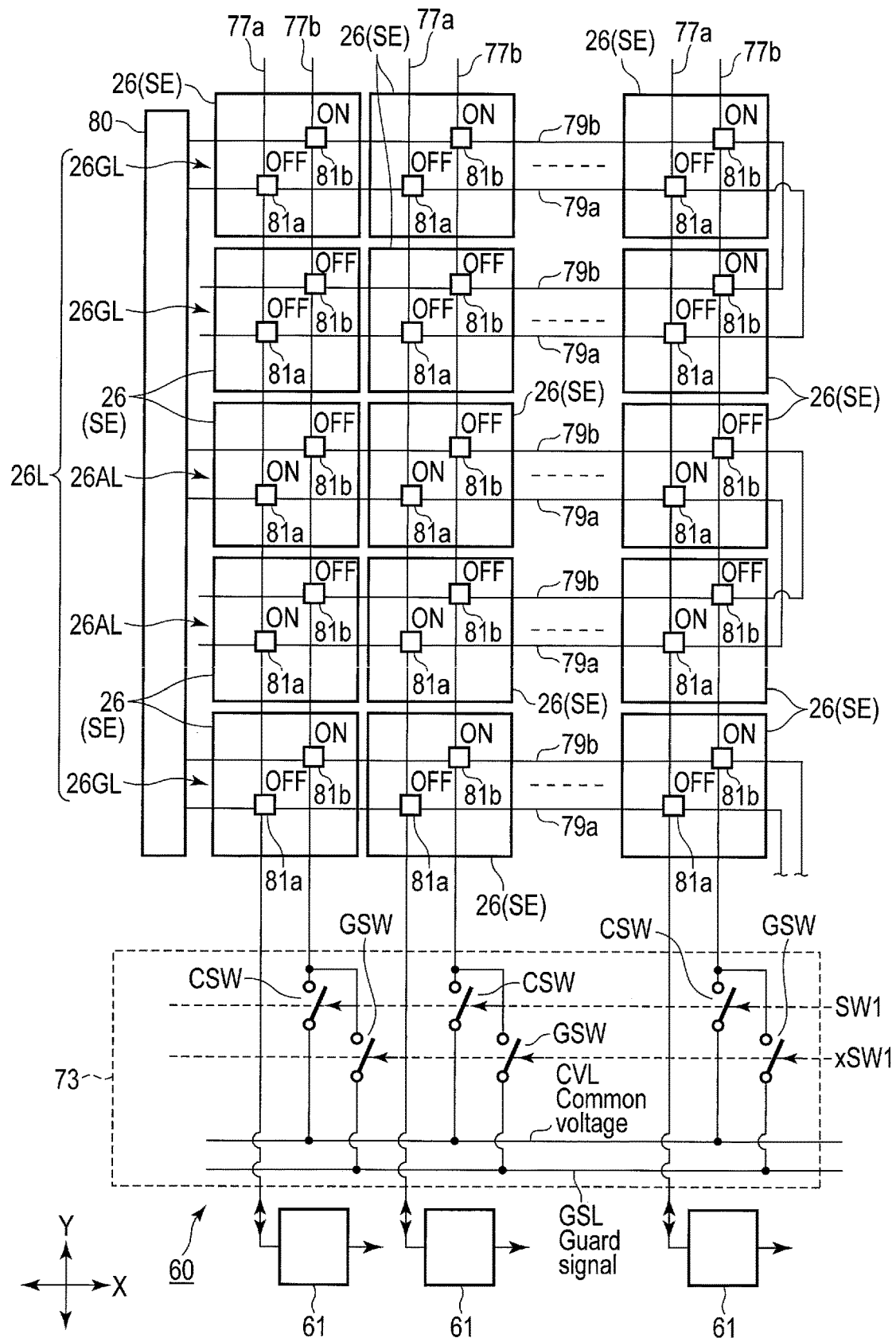
F I G. 13

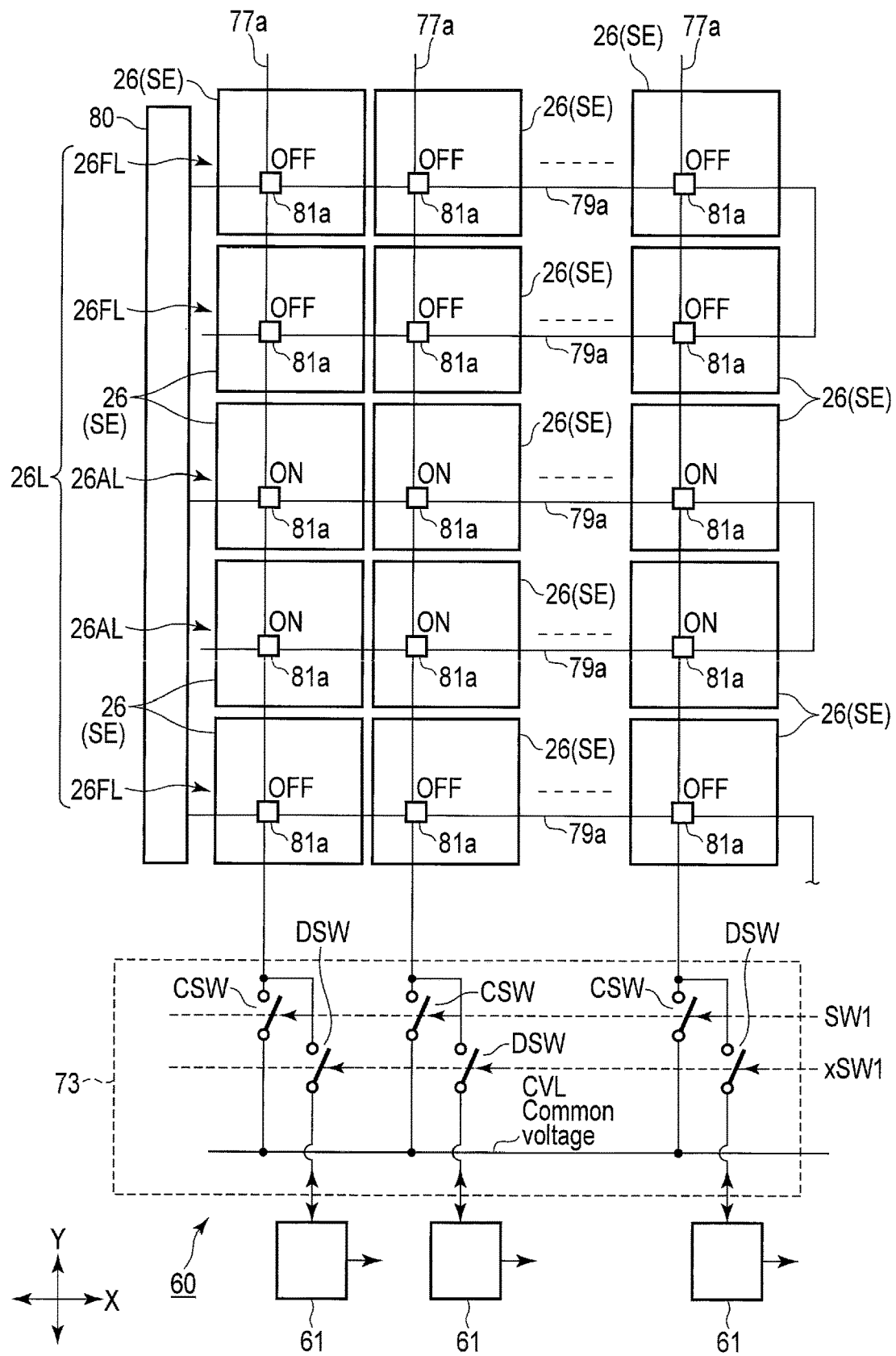
F I G. 14

DISPLAY DEVICE AND TOUCH DETECTION METHOD OF DISPLAY DEVICE

CROSS-REFERENCE TO RELATED APPLICATIONS

This application is a Continuation of application Ser. No. 16/055,709, filed Aug. 6, 2018, which is a Continuation of application Ser. No. 15/395,097, filed Dec. 30, 2016, now U.S. Pat. No. 10,067,601 issued Sep. 4, 2018, which is based upon and claims the benefit of priority from Japanese Patent Application No. 2016-046910, filed Mar. 10, 2016, the entire contents of which are incorporated herein by reference.

FIELD

Embodiments described herein relate generally to a display device and a touch detection method of a display device.

BACKGROUND

In general, display devices which can be applied to mobile communication terminals called smartphones or tablet computers can be operated by bringing a means for inputting data, such as a stylus or fingers, into contact with a display surface which displays an image. These display devices include in-cell display devices in which a touch detection function is partially or entirely incorporated into a display panel, and on-cell display devices in which a sensor having a touch detection function is provided on the display surface of a display panel.

As the above in-cell display device having a touch detection function, the following structure is known. Sensor electrodes formed of a transparent conductive film such as indium tin oxide (ITO) or indium zinc oxide (IZO) are provided in matrix in the display area which displays an image. A detection circuit is provided so as to correspond to each sensor electrode. Further, the sensor electrodes are connected to the detection circuits by thin metal lines.

However, the conventional display devices having a touch detection function require the same number of detection circuits as the number of sensor electrodes. Thus, it is difficult to respond to increase in the number of sensor electrodes caused by improvement of detection performance or by increase in the size of the display panel.

BRIEF DESCRIPTION OF THE DRAWINGS

FIG. 10 is a plan view schematically showing the circuit structure of a sensor drive controller provided in a liquid crystal display device having a touch function according to a second embodiment.

FIG. 13 is a plan view schematically showing the circuit structure of a modification example of the liquid crystal display device having a touch function according to the first embodiment.

FIG. 14 is a plan view schematically showing the circuit structure of a modification example of the liquid crystal display device having a touch function according to the second embodiment.

DETAILED DESCRIPTION

Figure 1:
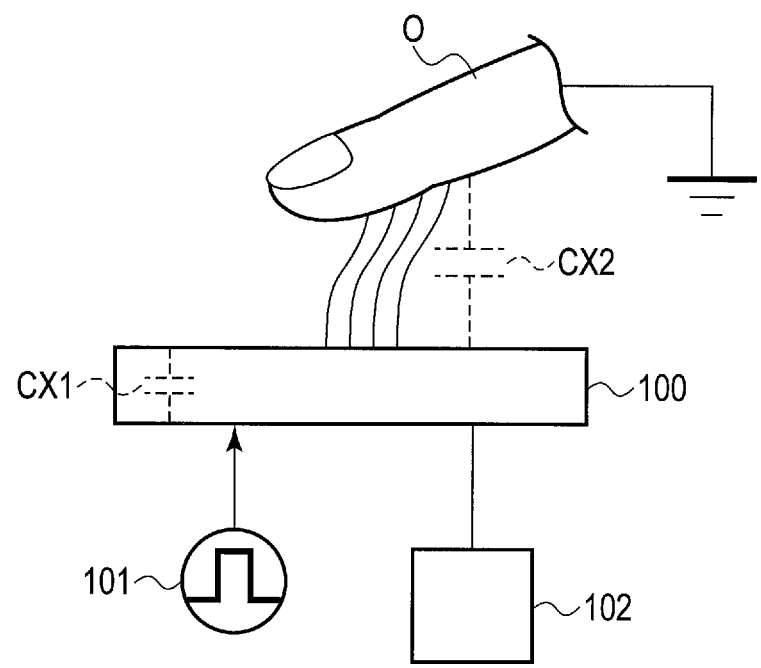
FIG. 1 schematically shows touch detection by a self-capacitive system.

The embodiments of the present invention provide a display device which realizes a decrease in the area of a detection circuit or an IC including the detection circuit and is advantageous in terms of power saving and manufacturing, and a touch detection method of the display device.

In general, according to one embodiment, a display device comprising:

a plurality of gate lines;

a plurality of data lines intersecting with the gate lines;

a plurality of pixel electrodes provided in areas defined by the gate lines and the data lines;

a plurality of common electrodes opposing to the pixel electrodes; and a sensor drive controller controlling the common electrodes to detect a touch, wherein the sensor drive controller comprises:

a switch drive circuit which selects at least one of the common electrodes for sensing, and selects the other common electrodes for non-sensing;

a sensing circuit which supplies a sensor signal to the common electrode selected for sensing; and a common voltage drive circuit comprising a first switch, and the first switch setting at least one of the common electrodes selected for non-sensing to a floating state.

According to another embodiment, a display device comprises:

a plurality of gate lines;

a plurality of data lines intersecting with the gate lines;

a plurality of pixel electrodes provided in areas defined by the gate lines and the data lines; and a sensor drive controller which comprises a plurality of common electrodes facing the pixel electrodes, and detects a touch by using the common electrodes, wherein the sensor drive controller selects at least one of the common electrodes, sets the selected common electrode as a sensor electrode in a sensing state, sets the selected other common electrodes as floating electrodes in a floating state, and further, selects the common electrode adjacent to the sensor electrode set to the sensing state as a guard electrode in a guard state.

According to yet another embodiment, a display device comprises:

a plurality of gate lines;

a plurality of data lines intersecting with the gate lines;

a plurality of pixel electrodes provided in areas defined by the gate lines and the data lines; and a sensor drive controller which comprises a plurality of common electrodes facing the pixel electrodes, and detects a touch by using the common electrodes, wherein the sensor drive controller selects at least one of the common electrodes as a sensor electrode set to a sensing state, and controls the sensor electrode by a self-capacitive system for inputting a sensor signal to the sensor electrode and detecting change in the sensor signal.

According to yet another embodiment, a display device comprises:

a plurality of gate lines;

a plurality of data lines intersecting with the gate lines;

a plurality of pixel electrodes provided in areas defined by the gate lines and the data lines; and a sensor drive controller which comprises a plurality of common electrodes facing the pixel electrodes, and detects a touch by using the common electrodes, wherein the sensor drive controller comprises at least one detection circuit for detecting a touch, and a plurality of select circuits which selectively connect the detection circuit and a specific common electrode.

According to one embodiment, in a touch detection method of a display device, the display device comprises:

a plurality of gate lines;

a plurality of data lines intersecting with the gate lines;

a plurality of pixel electrodes provided in areas defined by the gate lines and the data lines; and a plurality of common electrodes facing the pixel electrodes.

The method comprises:

selecting at least one of the common electrodes as a sensor electrode set to a sensing state;

selecting at least the common electrode adjacent to the sensor electrode set to the sensing state as a guard electrode set to a guard state; and setting the selected other common electrodes as floating electrodes set to a floating state.

Embodiments will further be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

(Touch Detection by Self-Capacitive System)

This specification explains the basic principle of touch detection by a self-capacitive system in a display device having a touch detection function according to each embodiment of the present invention.

FIG. 1 schematically shows touch detection by a self-capacitive system (a self-detection system). Touch detection means that contact or adjacency of a detection object with or to a sensor electrode is detected using the sensor electrode.

As shown in FIG. 1, touch detection by a self-capacitive system is performed by supplying a sensor signal 101 to a sensor electrode 100 and reading change in the sensor signal (specifically, change in the capacitance of the sensor signal). The sensor signal is changed in connection with contact or adjacency of a detection object O which can be regarded as a dielectric substance such as fingers or a stylus (hereinafter, simply referred to as a detection object) with or to the sensor electrode 100. The change in the sensor signal is detected by a detection circuit 102.

Touch detection by a self-capacitive system uses capacitance $Cx1$ of the sensor electrode and capacitance $Cx2$ produced by the detection object O adjacent to the sensor electrode 100.

Figure 2:
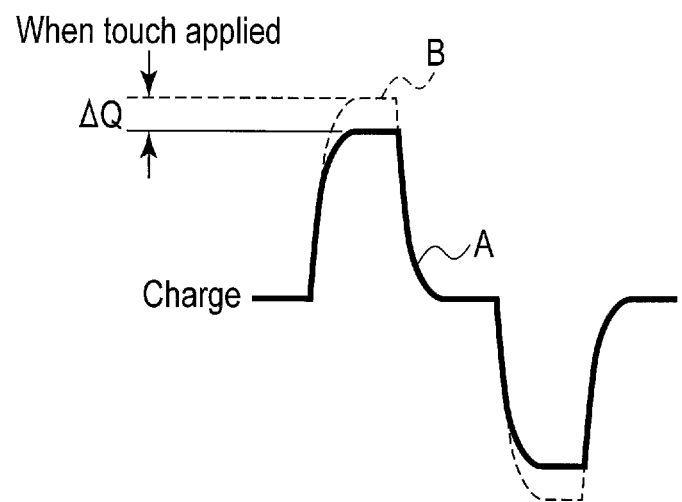
FIG. 2 is a graph showing change in capacitance when a touch is detected by a self-capacitive system.

In FIG. 2, solid line A shows temporal change in the sensor signal when the detection object O is neither in contact with nor adjacent to the sensor electrode 100. Since the detection object O is not close to the sensor electrode 100, no capacitance is produced between the sensor electrode SE and the detection object O. Only capacitance $Cx1$ of the sensor electrode is produced. The sensor signal 101 read by the detection circuit 102 exhibits the temporal change shown by solid line A in accordance with the input of the sensor signal 101 to the sensor electrode 100.

When the detection object O approaches or makes in contact with the sensor electrode 100 from the above state, capacitance $Cx2$ is produced between the sensor electrode 100 and the detection object O. By capacitance $Cx2$, a large amount of current is supplied to the sensor electrode SE. In FIG. 2, the dashed line shows change in the sensor signal in accordance with the charge amount when the detection object O is adjacent to the sensor electrode 100. As shown by the dashed line, the change is larger by charge amount $AQ$ than that when the detection object O is not present. This difference is detected by the detection circuit 102, and thus, the state of adjacency of the detection object O is determined.

First Embodiment

Now, this specification explains the details of a display device having a touch function and a method of driving the display device according to a first embodiment with reference to the accompanying drawings.

Figure 3:
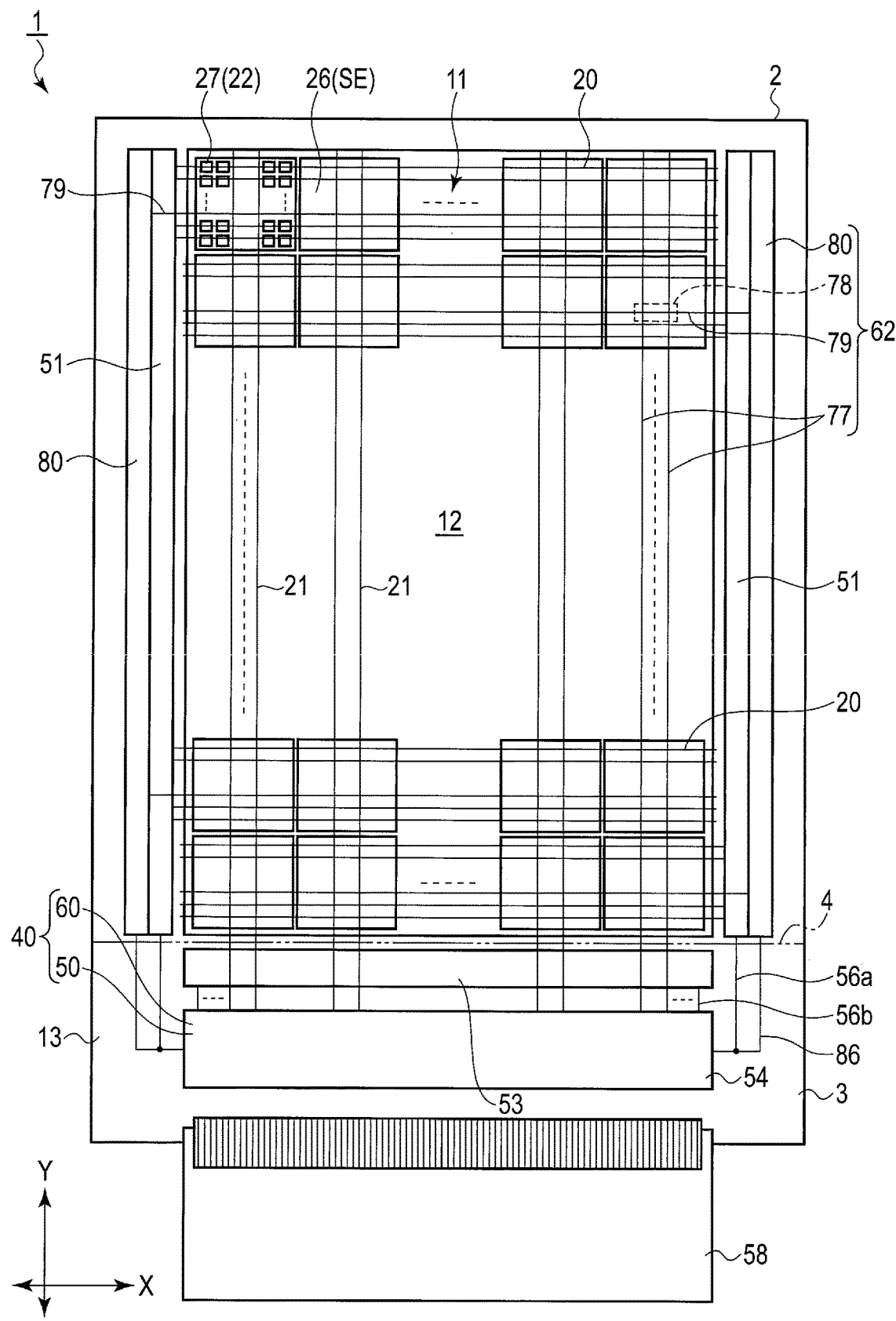
FIG. 3 is a plan view schematically showing the structure of a liquid crystal display device having a touch function according to a first embodiment.

As shown in FIG. 3, in the present embodiment, a display device 1 having a touch function comprises a liquid crystal display panel 2 in an active matrix type, and a backlight unit (not shown) provided on the rear side of the liquid crystal display panel 2. The display device 1 having a touch function displays an image with the light emitted from the backlight unit such that the surface opposite to the rear surface on which the backlight unit is provided is a display surface 11.

Hereinafter, a state in which the display surface 11 is viewed in the normal direction of the display surface 11 is called a plan view.

The liquid crystal display panel 2 comprises a first substrate 3, a second substrate 4 facing the first substrate 3, and a liquid crystal layer (the liquid crystal layer 5 shown in FIG. 5 later) provided between the first substrate 3 and the second substrate 4. The second substrate 4 faces the first substrate 3 on the display surface 11 side.

A rectangular display area 12 which allows the display surface 11 to display an image is provided on the liquid crystal display panel 2. Further, a frame-like non-display area 13 is provided around the display area 12 on the liquid crystal display panel 2.

The display area 12 may have a different shape such as a trapezoidal shape, a pentagonal shape, a hexagonal shape, an octagonal shape, another polygonal shape, a circular shape or an elliptical shape. Further, the liquid crystal display panel 2 may have a shape based on the display area 12, such as a trapezoidal shape, a pentagonal shape, a hexagonal shape, an octagonal shape, another polygonal shape, a circular shape or an elliptical shape. The shape of the liquid crystal display panel 2 is not necessarily the same as that of the display area 12. They may have different shapes. In addition, the liquid crystal display panel 2 may be deformed in an antiplane direction, and thus, may be a curved panel.

The liquid crystal display panel 2 has a touch detection function for detecting a touch with the detection object O on the display surface 11. To realize a display function and a touch function, the display device 1 having a touch function comprises a drive controller 40. The drive controller 40 comprises a display drive controller 50 which controls driving for displaying an image on the display surface 11, and a sensor drive controller 60 which controls driving for detecting a touch with the detection object O on the display surface 11.

In the following description, a touch refers to either contact or adjacency of a detection object with or to the display surface 11. The main part of the sensor drive controller 60 may be formed in, for example, an integrated circuit (IC; a controller 54) into which the drive controller 50 is incorporated. The sensor drive controller 60 may be formed on the first substrate SUB1 as a separate circuit. Alternatively, the sensor drive controller 60 may be formed on a flexible printed circuit (FPC) board as a circuit, or may be provided in another IC connected via an FPC board. The sensor drive controller 60 is partially formed in the display area and includes a switch drive circuit 80.

Now, this specification explains the specific structure of the liquid crystal display panel 2, mainly, the display area 12. The specification further explains the specific structures of the display drive controller 50 and the sensor drive controller 60.

The first substrate 3 comprises n first wirings (gate lines) 20 and m second wirings (data lines) 21 at positions corresponding to the display area 12 on the inner surface of the first substrate 3. Further, on the inner surface of the first substrate 3, a plurality of pixel electrodes 22 and a plurality of common electrodes 26 are formed. Note, above the wiring may be called an interconnection.

The gate lines 20 extend in a first direction X and are arranged at intervals in a second direction Y perpendicular to the first direction X.

The data lines 21 extend in the second direction Y and are arranged at intervals in the first direction X. By this structure, the data lines 21 intersect with the gate lines 20 in a plan view.

The common electrodes 26 are arranged in matrix in the display area 12. Each common electrode 26 faces a plurality of pixel electrodes 22.

As described above, the gate lines 20 intersect with the data lines 21 in a plan view. Thus, a plurality of pixel areas 27 defined by the gate lines 20 and the data lines 21 are formed in the display area 12. The pixel areas 27 are arranged in matrix in the first and second directions X and Y in the display area 12. In the display area 12, m×n pixel areas 27 are formed, where m and n are positive integers.

The first direction X must intersect with the second direction Y. In the above explanation, the first direction X is perpendicular to the second direction Y. However, the intersecting state includes a state other than a perpendicular state. For example, the first direction X may be substantially perpendicular to the second direction Y.

As described above, the pixel areas 27 are arranged in matrix in the present embodiment. In consideration of this structure, the first direction X and the second direction Y are also called a row direction and a column direction, respectively, in the following explanation.

The gate lines 20 and the data lines 21 are linearly formed in the present embodiment. However, the gate lines 20 and the data lines 21 may be curved partially or at a plurality of positions. For example, the gate lines 20 and the data lines 21 may be bent in each pixel area 27 such that the lines have a wave shape.

Figure 4:
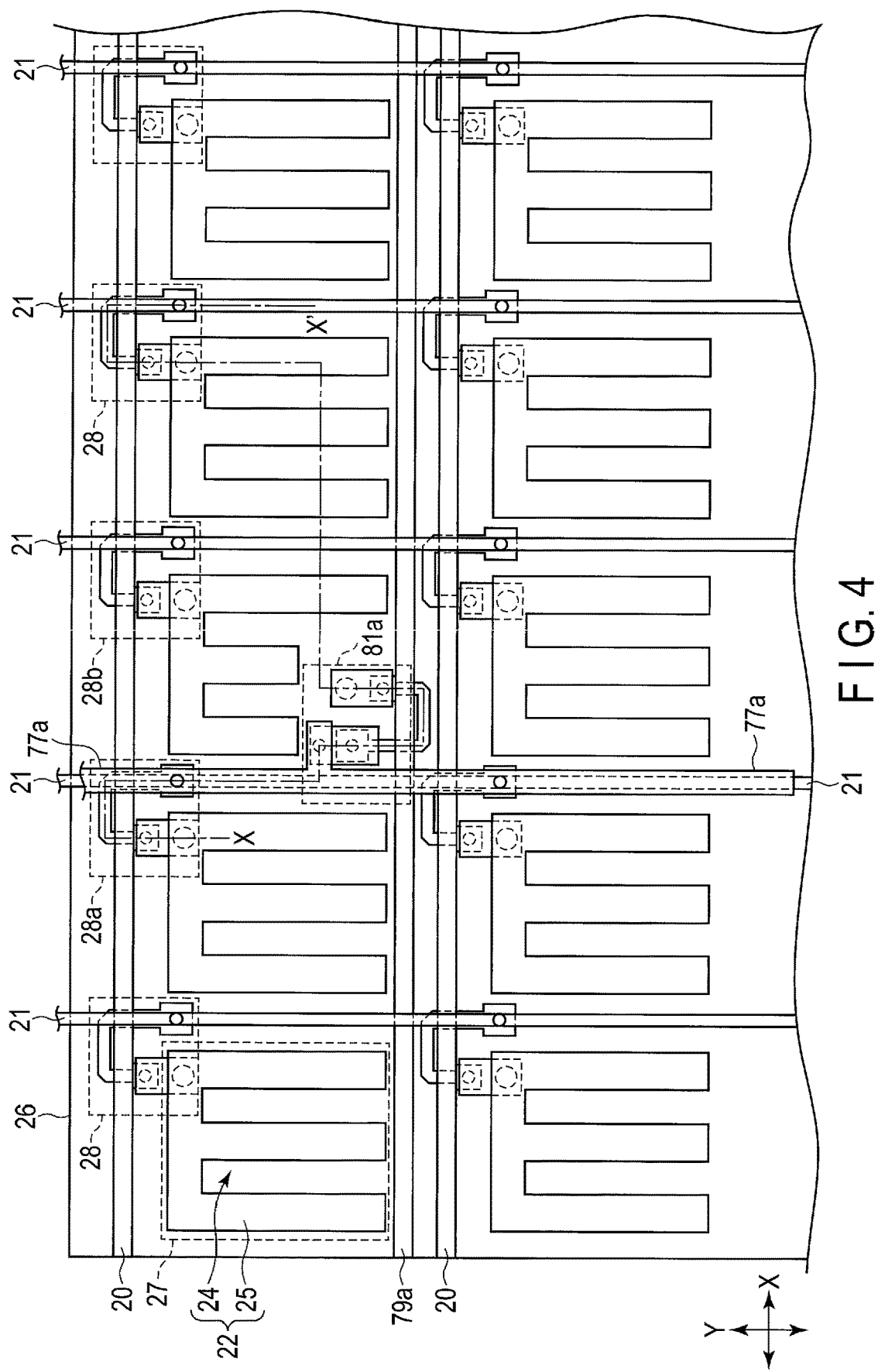
FIG. 4 is a plan view showing the pixel structure of the liquid crystal display device having a touch function according to the first embodiment.

As shown in FIG. 4, each pixel area 27 includes the pixel electrode 22, and a pixel switching element 28 which connects the pixel electrode 22 and the data line 21. Each common electrode 26 is provided so as to face a plurality of pixel electrodes 22. In the present embodiment, for example, 400 pixel electrodes (=20 pixel electrodes×20 pixel electrodes) face one common electrode 26. In the display area 12, a plurality of common electrodes 26 are arranged in matrix.

The pixel switching element 28 is formed by a thin-film transistor (TFT). The gate electrode of the thin-film transistor is connected to the gate line 20. The source electrode is connected to the data line 21. The drain electrode is connected to the pixel electrode 22.

Figure 5:
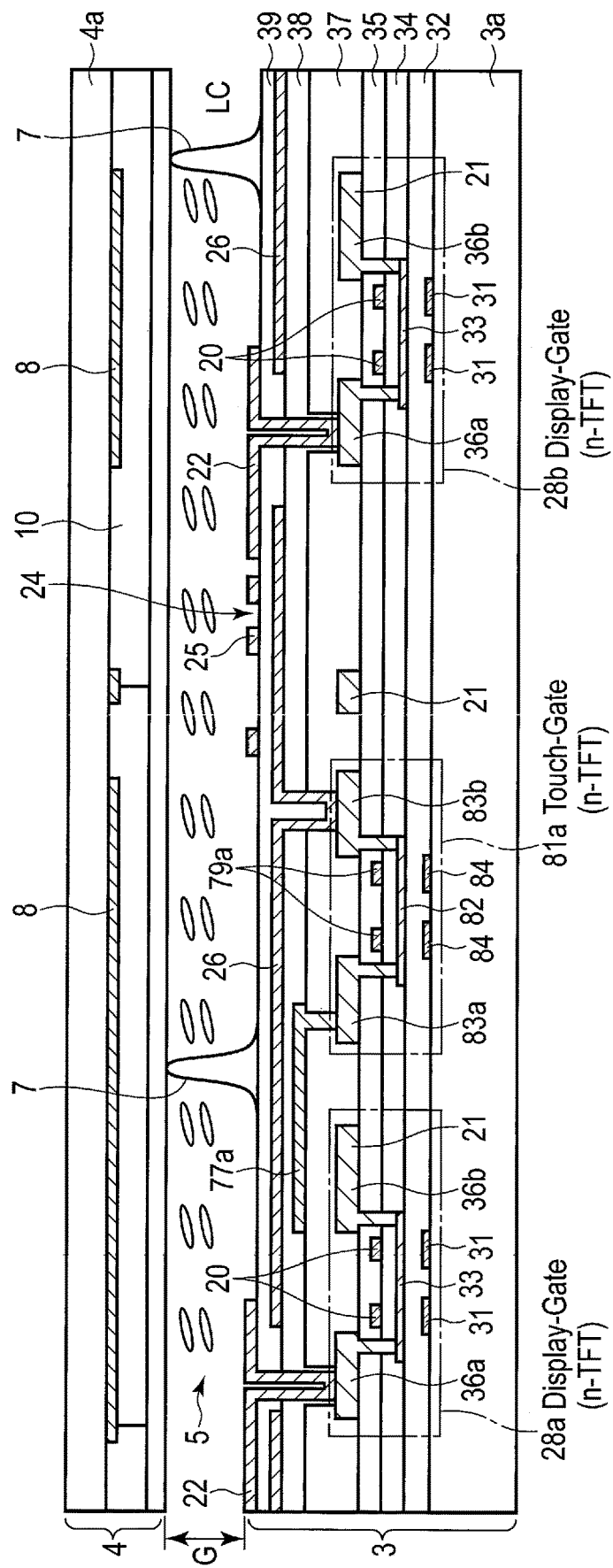
FIG. 5 is a cross-sectional view showing the layer structure of the liquid crystal display device having a touch function along dashed line X-X' of FIG. 4 according to the first embodiment.

FIG. 5 is a cross-sectional view schematically showing the layer structure of the liquid crystal display panel 2. The cross-sectional view of FIG. 5 is taken along dashed line X-X' of FIG. 4. FIG. 5 shows the cross-sectional surface of a pixel switch 28a, the cross-sectional surface of a select switching element 81a, and the cross-sectional surface of a pixel switch 28b regarding FIG. 4.

As shown in FIG. 5, the first substrate 3 is attached to the second substrate 4 via a sealing material (not shown) across a predetermined intervening cell gap G. The sealing material is provided in a rectangular form along the display area 12 in the non-display area 13. The liquid crystal layer 5 is encapsulated in the space surrounded by the first substrate 3, the second substrate 4 and the sealing material. A plurality of spacers 7 which keep the cell gap G constant are provided between the pair of substrates 3 and 4.

The first substrate 3 is formed using a first insulating substrate 3a having a phototransmissive property, such as a glass substrate or a resin substrate. A plurality of light-shielding layers 31 formed of metal are provided in an island form on a surface (inner surface) of the first insulating substrate 3a so as to face the second substrate 4. In FIG. 5, the light-shielding layers 31 are shown as light-shielding layers corresponding to the pixel switching elements 28. Light-shielding layers 84 are shown as light-shielding layers corresponding to select switching elements 81a and 81b described later. In FIG. 5, the layer structure of select switching element 81a is shown. A first insulating layer 32 is formed so as to cover the inner surface of the first insulating substrate 3a and the light-shielding layers 31.

A semiconductor layer 33, which is a channel layer, is formed at a position corresponding to the light-shielding layers 31 on the first insulating layer 32. Further, on the first insulating layer 32, a gate insulating film 34 is formed so as to cover the semiconductor layer 33. On the gate insulating layer 34, each gate line 20 is formed at a position facing the semiconductor layer 33.

Over the inner surface of the first insulating substrate 3a, further, a second insulating layer 35 is provided so as to cover the gate lines 20 and the gate insulating film 34. On the second insulating layer 35, a plurality of data lines 21 are formed. In the same layer as the data lines 21, a pair of electrode portions 36 (36a and 36b) is formed at a position facing the semiconductor layer 33. The pair of electrode portions 36 is in contact with the semiconductor layer 33 via the second insulating layer 35 and the gate insulating film 34. Each pixel switching element 28 is formed by the gate lines 20, the semiconductor layer 33 and the pair of electrode portions 36.

In the present embodiment, a top-gate TFT is employed as each pixel switching element 28. However, a bottom-gate TFT may be employed. In other words, the lower position of the semiconductor layer 33 and the upper positions of the gate lines 20 may be reversed. In addition, the semiconductor layer 33 of each pixel switching element 28 is formed of low-temperature polysilicon. However, the semiconductor layer 33 may be formed of amorphous silicon.

A planarization film 37 is provided so as to cover the data lines 21, the pair of electrode portions 36 and the second insulating layer 35. On the planarization film 37, a third insulating layer 38 is provided. On the third insulating layer 38, the common electrodes 26 are provided.

As shown in FIG. 3 to FIG. 5, each common electrode 26 has a rectangular shape having a size which is allowed to face a plurality of pixel areas 27 (for example, 20 pixel electrodes×20 pixel electrodes) in the display area 12. The common electrodes 26 are arranged in matrix in the first direction X and the second direction Y.

In the present embodiment, as described above, a plurality of common electrodes 26 are arranged in matrix. Thus, the common electrodes 26 are also used as sensor electrodes for touch detection. The specific structure as sensor electrodes is explained later.

A fourth insulating layer 39 is formed so as to cover the common electrodes 26 provided in a tile form, and the third insulating layer 38. On the fourth insulating layer 39, each pixel electrode 22 is formed.

Every pixel area 27 comprises a pixel electrode 22. The pixel electrode 22 faces the common electrode 26 via the fourth insulating layer 39. The pixel electrode 22 has a comb shape such that a slit 24 and a line portion 25 are alternately provided. The pixel electrode 22 is in contact with the electrode portion 36 of the pixel switching element 28 via the third insulating layer 38.

Each common electrode 26 and each pixel electrode 22 are formed of a transparent conductive material such as ITO or IZO. The insulating layers 32, 35, 38 and 39, the gate insulating film 34 and the planarization film 37 are formed of, for example, an organic insulating material such as polyimide resin, or an inorganic insulating material such as silicon nitride or silicon oxide.

A first alignment film (not shown) which defines the initial alignment of the liquid crystal molecules of the liquid crystal layer 5 is provided so as to cover the pixel electrodes 22 and the fourth insulating layer 39.

The second substrate 4 is formed using a second insulating substrate 4a having a phototransmissive property, such as a glass substrate or a resin substrate. The second insulating substrate 4a comprises, for example, a black matrix 8 provided at a position facing the gate lines 20 and the data lines 21, a color filter 10, an overcoat layer and a second alignment film AL2 (none of them is shown) on a side facing the first substrate 3.

In the above pixel structure, an electric field is produced between the pixel electrodes 22 and the common electrodes 26. Thus, a fringe electric field is produced between the pixel electrodes 22 and the common electrodes 26 via the slits 24 of the pixel electrodes 22. By the fringe electric field, the orientation of the alignment of the liquid crystal molecules of the liquid crystal layer 5 is changed. In this way, the optical characteristics of the liquid crystal layer 5 vary depending on the pixel area 27. As a result, it is possible to display an image on the display surface 11. The display mode using a fringe electric field is called a fringe field switching (FFS) mode.

As shown in FIG. 3, the first substrate 3 comprises a gate line drive circuit 51 which drives the gate lines 20, a multiplexer 53 which controls an image signal transmitted to the data lines 21, and the main controller 54 which controls the gate line drive circuit 51 and the multiplexer 53. Out of these circuits, the gate line drive circuit 51 and the multiplexer 53 are formed on the first substrate 3. The main controller 54 is formed as an IC chip, and is mounted on the first substrate 3. The gate line drive circuit 51 and the multiplexer 53 are electrically connected to the main controller 54 via control lines 56a and 56b.

Figure 6A:
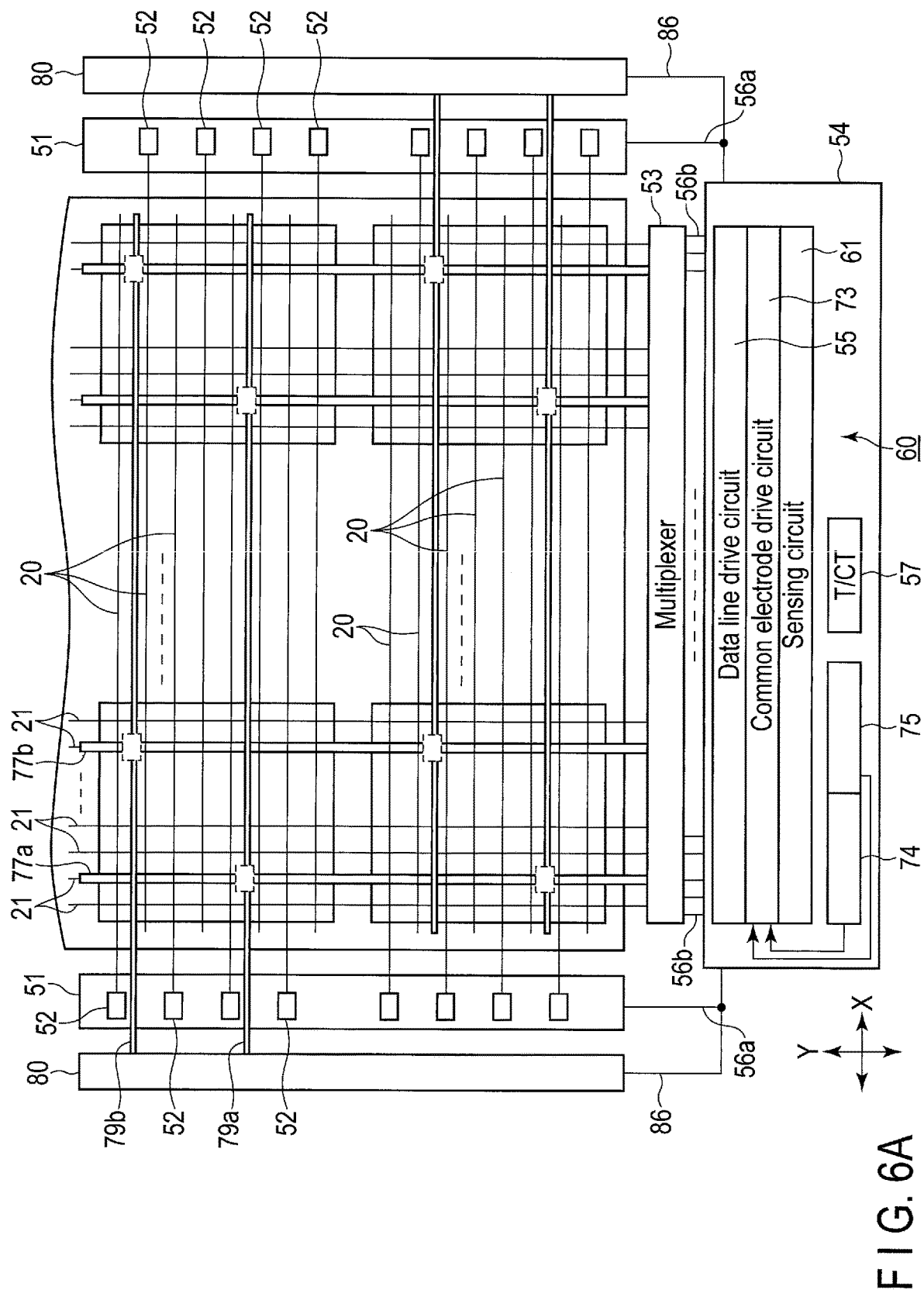
FIG. 6A is a plan view schematically showing the structure of a controller provided in the liquid crystal display device having a touch function according to the first embodiment.
Figure 6B:
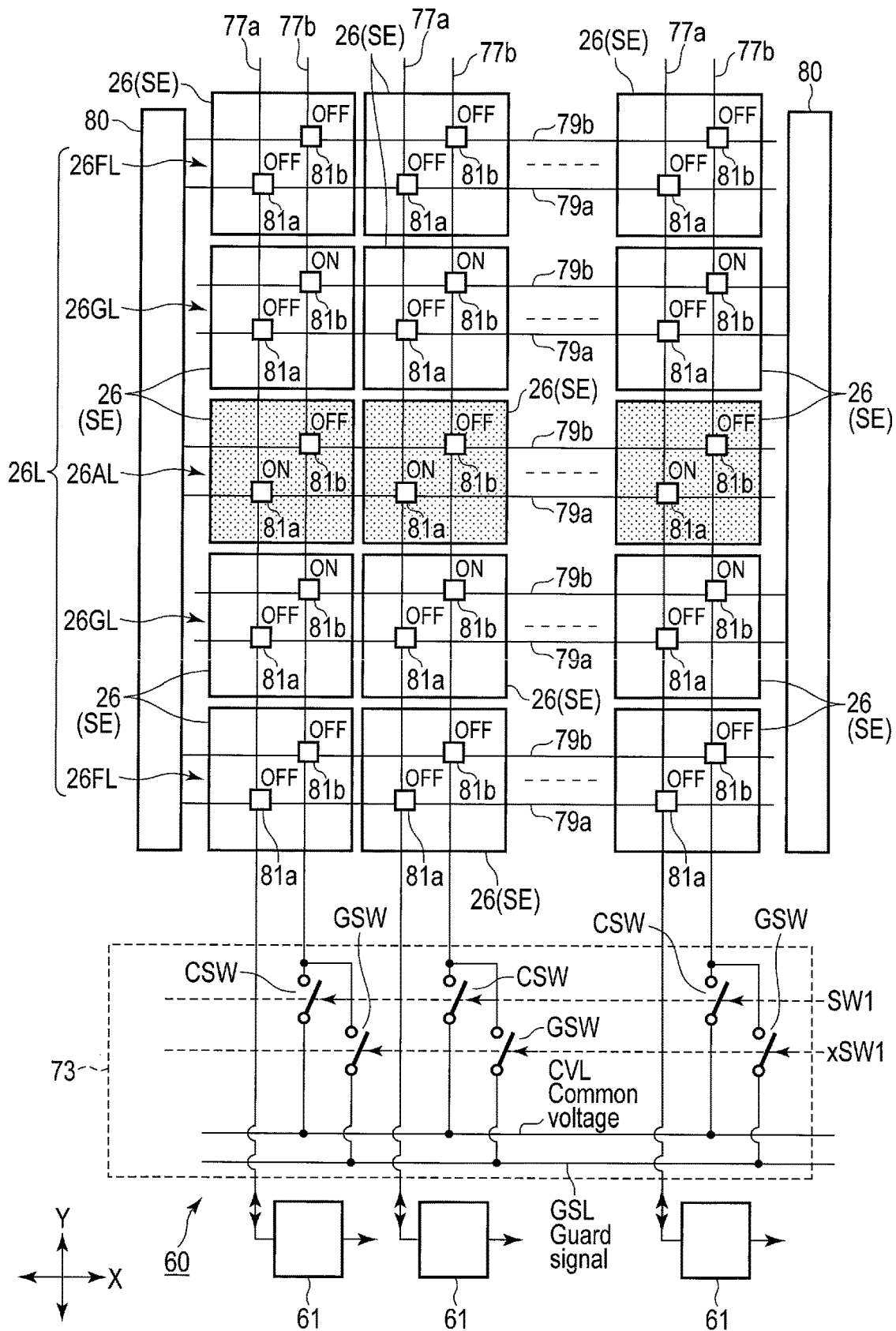
FIG. 6B is a plan view schematically showing structural elements which contribute to touch detection in the liquid crystal display device having a touch function according to the first embodiment.

As shown in FIG. 6A, the main controller 54 comprises a data line drive circuit 55 for driving the data lines 21 via the multiplexer 53. The main controller 54 further comprises a timing controller (a controller) 57 for controlling the data line drive circuit 55, the gate line drive circuit 51 and the multiplexer 53. FIG. 6A mainly shows the structural elements which contribute to display such that the structures of the present embodiment can be easily understood. FIG. 6B mainly shows the structural elements which contribute to touch detection. In the actual device, the structural elements shown in FIG. 6A and FIG. 6B are integrally formed.

As shown in FIG. 6A, the gate lines 20 formed in the display area 12 extend to the non-display area 13, and are connected to the gate line drive circuit 51. The gate line drive circuit 51 comprises a plurality of gate shift registers 52 electrically connected to each other. The gate lines 20 are connected to the gate shift registers 52 in a one-to-one relationship. In FIG. 6A, the gate line drive circuit 51 is provided on each side of the display area 12 in a horizontal direction (direction X). However, the gate line drive circuit 51 may be provided only one of the two sides.

The data lines 21 extend to the outside of the display area 12, and are connected to the multiplexer 53. In FIG. 6A, third wirings 77a and 77b used for touch detection are shown. Third wirings 77a and 77b are formed at positions overlapping the data lines 21, which are second wirings, via the insulating layer.

As shown in FIG. 3, a flexible wiring 58 is provided at a position facing the main controller 54 on the first substrate 3. The flexible wiring 58 connects an external control module (not shown) such as an external application processor to the main controller 54.

In the present embodiment, a sensor drive controller 60 for detecting a touch with the detection object O on the display surface 11 is further formed on the liquid crystal display panel 2. More specifically, a structure for using the common electrodes 26 which contribute to display as sensor electrodes SE and driving the common electrodes 26 so as to function as sensor electrodes SE is formed in the display area 12 and the non-display area 13.

As shown in FIG. 3, FIG. 6A, FIG. 6B and FIG. 7A, the sensor drive controller 60 causes the common electrodes 26 to function as sensor electrodes SE. The sensor drive controller 60 comprises a sensing circuit 61 which detects presence or absence of a touch based on a sensor signal, and a select circuit 62 which selects one of the common electrodes 26 as a sensor electrode SE. The main controller 54 comprises a common electrode drive circuit 73 for supplying a signal to the common electrodes 26 separately from the sensing circuit 61.

Figure 7A:
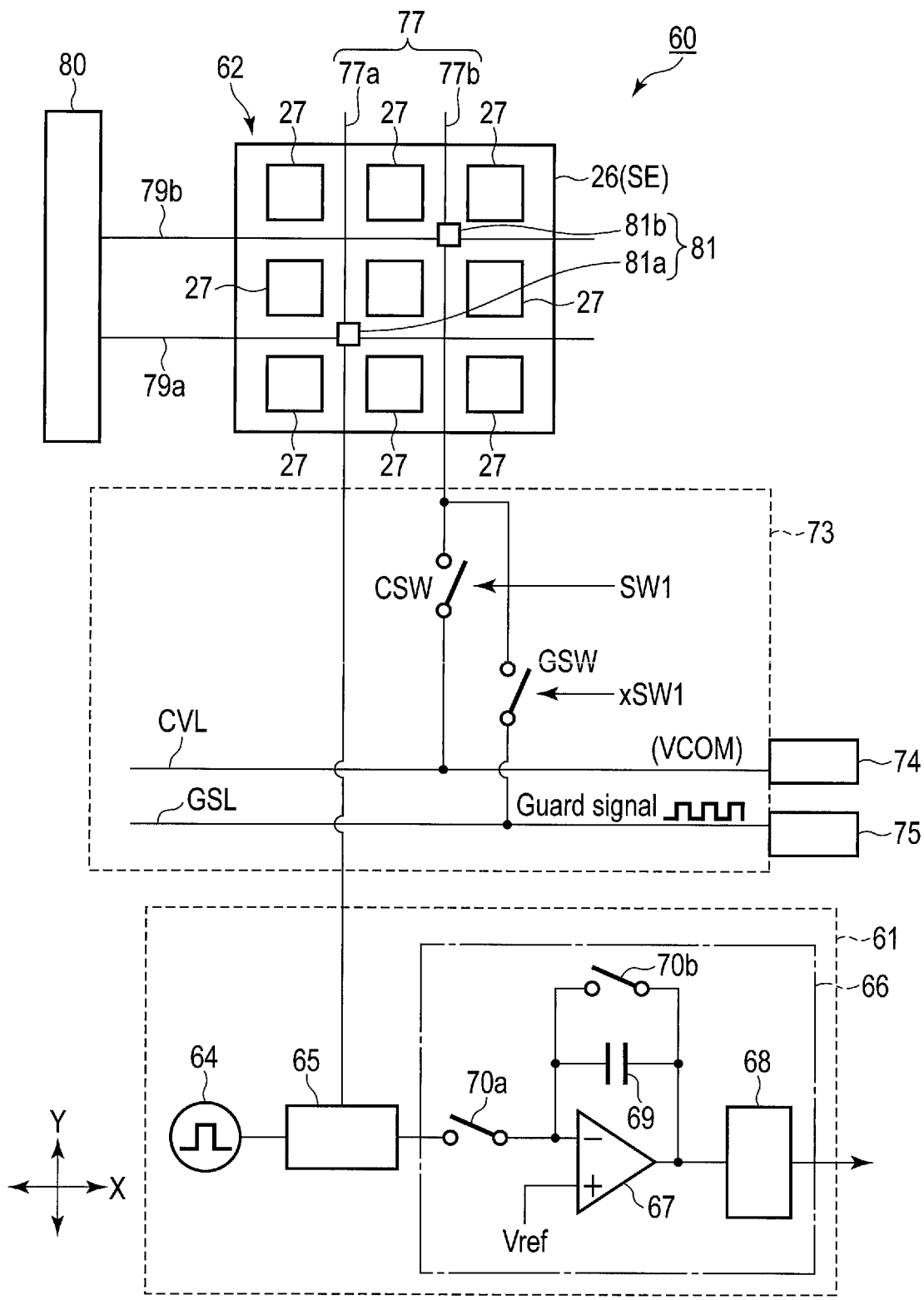
FIG. 7A is a plan view schematically showing the circuit structure of a sensor drive controller provided in the liquid crystal display device having a touch function according to the first embodiment.

FIG. 7A shows the select circuit 62 for causing the common electrode 26 to operate as a sensor electrode SE. FIG. 7A shows one of the sensor electrodes SE (common electrodes 26) of FIG. 6B as a representative example. The select circuit 62 comprises a pair of third wirings 77a and 77b provided so as to face the common electrode 26, the switch portions 81 including select switching elements 81a and 81b connecting third wirings 77a and 77b to the common electrode 26, and switch lines 79a and 79b connected to the switch portions 81. Switch lines 79a and 79b are connected to the switch drive circuit 80 in the non-display area 13. The switch portions 81 are formed for each common electrode 26.

As shown in FIG. 4 and FIG. 6B, in the display area 12, a plurality of third wirings 77 including a pair of third wirings 77a and 77b extend in the second direction Y, which is the extension direction of the data lines 21. The third wirings 77 are provided at predetermined intervals in the first direction X. In the present embodiment, the third wirings 77 are provided at positions which overlap or substantially overlap the data lines 21 via the insulating layer in a plan view. The third wirings 77 are formed on the planarization film 37 and are covered by the third insulating layer 38 together with the planarization film 37 such that the third wirings 77 overlap the data lines 21 (see FIG. 5).

The number of third wirings 77 may be any number as long as at least one pair of third wirings 77a and 77b is provided for each common electrode 26. For example, the third wirings 77 may overlap all the data lines 21 such that each common electrode 26 faces the same number of third wirings 77 (77a and 77b) as the number of data lines 21. In this case, the third wirings 77 may be used as dummy wirings.

The switch portions 81 include a pair of select switching elements 81a and 81b formed between a pair of third wirings 77a and 77b and the common electrode 26. Select switching elements 81a and 81b may be set to an on-state or off-state by control voltage from switch lines 79a and 79b, respectively. In the pixel area 27 in which each of select switching elements 81a and 81b is provided, the area of the pixel electrode 22 is reduced by the area of the select switching element. More specifically, the line portions 25 corresponding to each of select switching elements 81a and 81b are shortened. In the space generated by this structure, each of select switching elements 81a and 81b is formed.

In the pixel area 27 in which each of select switching elements 81a and 81b is provided, the opening rate subjected to display is reduced by the area of the select switching element. In terms of this factor, as the pixel in which each of select switching elements 81a and 81b is provided, the pixel area 27 corresponding to blue (B) is desirable.

As shown in FIG. 5, each select switching element (select switching element 81a is shown in FIG. 5 as a representative example) is formed by a thin-film transistor (TFT) having a structure similar to that of each pixel switching element 28 which connects the pixel electrode 22 and the data line 21.

Specifically, select switching element 81a comprises a semiconductor layer 82 formed in the same layer as the semiconductor layer 33 of the pixel switching element 28, and a pair of electrode portions 83a and 83b in the same layer as the pair of electrode portions 36a and 36b of the pixel switching element 28. The pair of electrode portions 83a and 83b is in contact with the semiconductor layer 82 via the gate insulating film 34. The light-shielding layer 84 is provided at a position facing the semiconductor layer 82 of select switching element 81a. The light-shielding layer 84 is formed in the same layer as the light-shielding layer 31 of the pixel switching element 28.

In the present embodiment, the light-shielding layer 84, the semiconductor layer 82 and the pair of electrode portions 83a and 83b in each select switching element 81 are formed in the same layers as the structures of each pixel switching element 28. In this way, each of select switching elements 81a and 81b can be formed in the steps for forming each pixel switching element 28. Thus, it is possible to prevent increase in the number of steps caused by forming each select switching element 81a or 81b. However, each structure of each select switching element 81a or 81b may be formed in a layer or way different from those of each pixel switching element 28.

Regarding select switching element 81a, third wiring 77a is in contact with electrode portion 83a on the source side via the planarization film 37. The common electrode 26 is in contact with electrode portion 83b on the drain side via the third insulating layer 38 and the planarization film 37. In this way, select switching element 81a connected to the common electrode 26 is formed. Select switching element 81b is also formed in the same process as that of select switching element 81a. Select switching element 81a is connected to third wiring 77a, and select switching element 81b is connected to third wiring 77b. Select switching element 81a is controlled so as to be in an on-state or off-state by control voltage from switch line 79a. Select switching element 81b is controlled so as to be in an on-state or off-state by control voltage from switch line 79b.

Both select switching element 81a and select switching element 81b are formed as, for example, n-TFT. The semiconductor channel is not limited to this example. Select switching elements 81a and 81b may be formed as p-TFT. When they are formed with the same channel, the manufacturing convenience is improved.

Switch lines 79a and 79b are formed in the same layer as the gate lines 20, and are covered by the second insulating layer 35 in the same manner as the gate lines 20 (switch line 79a is shown in FIG. 4 and FIG. 5, and switch lines 79a and 79b are shown in FIG. 6A).

As shown in FIG. 3, FIG. 4 and FIG. 6B, switch lines 79a and 79b extend in the first direction X, which is the extension direction of each gate line 20. Switch lines 79a and 79b are provided at predetermined intervals in the second direction Y. More specifically, a pair of switch lines 79a and 79b is provided for a plurality of common electrodes 26 arranged in a corresponding row.

With the above structure, the switch portions 81 switch the state of connection between the third wirings 77 and the common electrodes 26 as follows.

When a switch signal is input to switch line 79a, select switching element 81a is set to an on-state in response to the signal, and the common electrode 26 is connected to third wiring 77a. In a state where a switch signal is not supplied to switch line 79a, select switching element 81a is set to an off-state, and the common electrode 26 is disconnected from third wiring 77a. When a switch signal is input to switch line 79b, select switching element 81b is set to an on-state, and the common electrode 26 is connected to third wiring 77b. In a state where a switch signal is not supplied to switch line 79b, select switching element 81b is set to an off-state, and the common electrode 26 is disconnected from third wiring 77b.

When one common electrode 26 is connected to third wiring 77a or 77b, this state is indicated as ON. When they are disconnected from each other, the state is indicated as OFF. In this case, it is possible to obtain a sensing state, a guard state and a floating state as follows based on the presence or absence of a switch signal from switch lines 79a and 79b.

<Sensing State>

A switch signal from switch line 79a is present, and select switching element 81a is ON.

A switch signal from switch line 79b is absent, and select switching element 81b is OFF.

When a switch signal is present, for example, the signal is high. When a switch signal is absent, for example, the signal is low.

A common electrode 26 in a sensing state may be called a sensing (sensor) electrode.

<Guard State>

A switch signal from switch line 79a is absent, and select switching element 81a is OFF.

A switch signal from switch line 79b is present, and select switching element 81b is ON.

A common electrode 26 in a guard state may be called a non-sensing electrode or a guard electrode.

<Floating State>

A switch signal from switch line 79a is absent, and select switching element 81a is OFF.

A switch signal from switch line 79b is absent, and select switching element 81b is OFF.

A common electrode 26 in a floating state may be called a non-sensing electrode or a floating electrode.

Each row of common electrodes 26 shown in FIG. 6B is set to the same switching state in accordance with the combination of presence and absence of a switch signal from switch lines 79a and 79b as explained above.

FIG. 6B shows an example of a period of touch detection. In touch detection, the common electrodes 26 which belong to a predetermined row are selected as the sensor electrodes 26 (SE). When the predetermined row is row 26AL, row 26AL is set to a sensing state. The upper and lower rows adjacent to row 26AL are controlled so as to be in a guard state. A pair of rows 26GL adjacent to row 26AL of sensor electrodes in a sensing state is set to a guard state. Thus, it is possible to prevent the electric field generated in the sensor electrodes 26 (SE) from spreading off the upper side of the sensor electrodes.

Each row 26FL is a row which is away from the row of common electrodes 26 selected as the sensor electrodes 26 (SE) across at least one intervening row. Each row 26FL is set to a floating state. No signal is input to the rows in a floating state. Thus, power consumption is reduced in comparison with that when a guard signal is input. In FIG. 6B, one row is selected as the row of common electrodes 26 (SE) in a sensing state, and only the rows immediately above and under the selected row are in a guard state. However, a plurality of rows may be set to a guard state on each of the upper and lower sides.

In addition to the sensing circuit 61 and the select circuit 62, the sensor drive controller 60 comprises the switch line drive circuit 80 and the common electrode drive circuit 73. The switch line drive circuit 80 is formed along the gate line drive circuit 51 in the non-display area 13. The common electrode drive circuit 73 and the sensing circuit 61 are incorporated into the IC chip which is the main controller 54.

The switch line drive circuit 80 is connected to the main controller 54 via a control line 86. The switch lines 79 extend to the non-display area 13, and are connected to the switch line drive circuit 80.

As shown in FIG. 6B, a pair of third wirings 77a and 77b extends to the main controller 54, and is connected to the common electrode drive circuit 73 and the sensing circuit 61 in the main controller 54.

As shown in FIG. 7A, the common electrode drive circuit 73 includes a guard signal line GSL and a common voltage line CVL. The guard signal line GSL is connected to a guard signal generation module 75. The guard signal line GSL can be connected to third wiring 77b via a guard signal switch GSW. The guard signal switch GSW is controlled so as to be in an on-state or off-state by a switch control signal xSW1 from the timing controller 57. The common voltage line CVL is connected to a constant-voltage circuit formed in the main controller 54, for example, a common voltage generation module 74. The common voltage line CVL can be connected to third wiring 77b via a common voltage switch CSW in the display period (Display) shown in FIG. 8.

Now, this specification explains a circuit operation for obtaining the operation state of the common electrode 26 in a display period and the operation state in a touch period in FIG. 7A.

(a) Common Electrode 26 in Display Period

In this period, select switching element 81b is set to an on-state by a switch signal from switch line 79b, and select switching element 81a is set to an off-state by a switch signal from switch line 79a. Switch CSW is set to an on-state by a switch control signal SW1 from the timing controller 57. As a result, the common voltage from the common voltage generation module 74 is applied to the common electrode 26 in a display period.

(b) Common Electrode 26 in Touch Period

In this period, the common electrode 26 may be set to one of the following three states based on the position of touch scanning. The three states are a sensing state, a guard state and a floating state.

(b-1) Set to Sensing State

In this case, select switching element 81b is set to an off-state by a switch signal from switch line 79b, and select switching element 81a is set to an on-state by a switch signal from switch line 79a. Thus, a sensing signal having a predetermined pulse wave is supplied from the sensing circuit 61 to the common electrode 26 via third wiring 77a. At this time, the sensing circuit 61 detects whether or not a detection object is in contact with the common electrode 26. The sensing circuit 61 is explained in detail later.

(b-2) Set to Guard State

In this case, select switching element 81b is set to an on-state by a switch signal, and select switching element 81a is set to an off-state by a switch signal. Switch GSW is set to an on-state by a switch control signal xSW1 from the timing controller 57. Switch CSW is set to an off-state. As a result, a guard signal is supplied from the guard signal generation module 75 to the common electrode 26.

(b-3) Set to Floating State

In this case, select switching element 81b is set to an off-state by a switch signal, and select switching element 81a is set to an off-state by a switch signal. As a result, no signal is supplied to the common electrode 26. No voltage is applied to the common electrode 26. Thus, the common electrode 26 is set to a floating state.

The above sensing circuit 61 is further explained. The sensing circuit 61 is a circuit for realizing touch detection by a self-capacitive system, and comprises a sensor signal generation module 64, a mirror circuit 65 and a detection circuit 66. The sensor signal generation module 64 generates a predetermined pulse wave as a sensor signal. The pulse wave has the same waveform and the same phase as those of the pulse wave of the guard signal generation module 75.

The mirror circuit (current mirror circuit) 65 is connected to the sensor signal generation module 64 on the upstream side, and is connected to third wiring 77a on the downstream side. The mirror circuit 65 is connected to the detection circuit 66. The mirror circuit 65 has this state of connection. Thus, when a sensor signal is supplied from the sensor signal generation module 64 to third wiring 77a, the same signal as the sensor signal is input to the detection circuit 66 as it is.

The detection circuit 66 comprises a switch 70a, a comparison device 67, an A/D converter 68 and a filter 69.

The comparison device 67 receives a sensor signal via the mirror circuit 65. The connection between the comparison device 67 and the common electrode 26 selected as a sensor electrode SE is switched by switch 70a provided in the former stage of the comparison device 67. A capacitor 67 and a switch 70b are connected to the comparison device 67 in parallel. The output of the comparison device 67 is reset by switching switch 70b. The timing controller 57 controls switching switch 70a and switch 70b.

The A/D converter 68 converts the value output by the comparison device 67 into a digital signal, and outputs it to an external processing circuit (not shown). A calculation process is performed in the processing circuit based on the data from each detection circuit 66. In this way, the position of a touch is specified. The principle of touch detection is explained above with reference to FIG. 1 and FIG. 2.

As described above, the detection circuit 66 of the sensing circuit 61 is provided for each select circuit 62. More specifically, one detection circuit 66 is provided for the common electrodes (or the group of common electrodes) 26 in one column connected to a pair of third wirings 77a and 77b. Thus, at least one detection circuit 66 must be provided for each column of common electrodes 26. The number of detection circuits 66 is extremely less than that of common electrodes 26.

The display device of the present embodiment has the above structures. Thus, it is possible to decrease the area of the sensing circuit (detection circuit) 61 or an IC including the sensing circuit (detection circuit) 61. In addition, the display device is advantageous in terms of power saving and manufacturing.

Figure 7B:
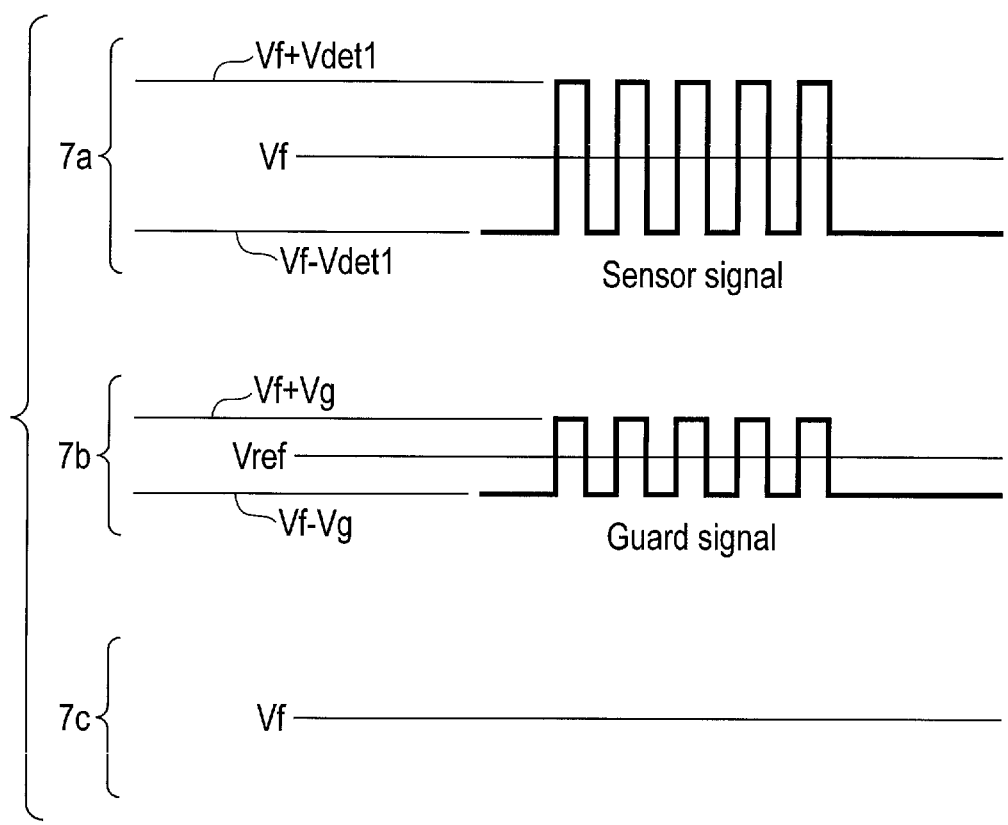
FIG. 7B shows an example of relationships between sensor signal voltage, guard signal voltage and floating voltage in the liquid crystal display device having a touch function according to the first embodiment.

FIG. 7B shows an example of relationships between sensor signal voltage, guard signal voltage and floating voltage as described above. The amplitude (voltage)±of a sensor signal based on reference voltage Vf (Vf±Vdet1) may be the same as that of a guard signal based on reference voltage Vf (Vf±Vg). However, the amplitude of a guard signal is preferably less than that of a sensor signal. For example, the voltage of a guard signal is set between floating voltage Vf and the maximum voltage of a sensor signal (for example, set to half of the difference). This adjustment is performed by the output voltage adjustment of the guard signal generation module 75 and the output voltage adjustment of the sensor signal generation module 64.

In the above manner, the drive controller 40 sets the phase of an AC sensing signal supplied to a sensor electrode so as to be the same as that of an AC guard signal supplied to a guard electrode. The drive controller 40 sets the amplitude (voltage) of an AC guard signal so as to be less than that of an AC sensing signal. In other words, the drive controller 40 sets the amplitude (voltage) of an AC guard signal so as to be close to floating voltage. In this way, it is possible to reduce power consumption in each row supplied with a guard signal. In comparison with a case where a guard signal has the same amplitude as a sensing signal, it is possible to reduce the difference in potential between a floating electrode and a sensor electrode in a touch period. This specification further explains a method of driving the display device 1 having a touch function with reference to FIG. 6A, FIG. 6B, FIG. 7A, FIG. 7B and FIG. 8.

Figure 8:
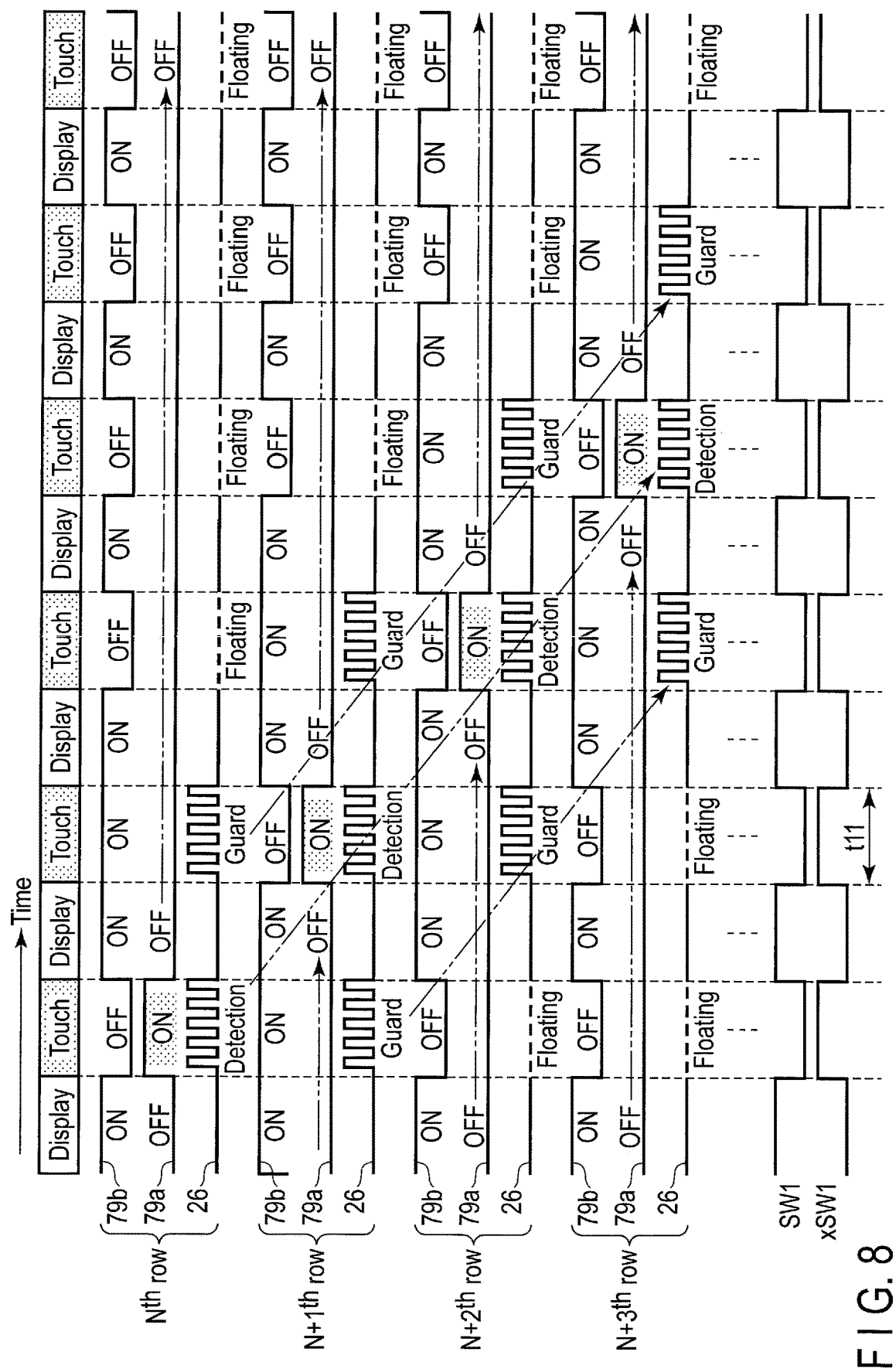
FIG. 8 is a timing chart shown for explaining the sequence of driving common electrodes in the liquid crystal display device having a touch function according to the first embodiment.

As shown in FIG. 8, in the present embodiment, the display device 1 having a touch function is controlled by the drive controller 40. By this control, a display period (Display) for displaying an image on the display surface 11 and a sensor period (Touch) for detecting a touch on the display surface 11 are alternately provided. This control is performed in series based on a clock signal from the timing controller 57.

In each display period (Display), a switch signal for setting all of select switching elements 81b to an on-state and setting all of select switching elements 81a to an off-state is output from the switch drive circuit 80. Switches CSW provided in the common electrode drive circuit 73 in FIG. 7A are set to an on-state. Thus, all of the common electrodes 26 are maintained at certain common voltage (VCOM).

Further, in the display period (Display), a signal is input to the gate shift registers 52 (see FIG. 6A) in a time-divisional manner. Thus, a gate signal is supplied to the pixel switching elements 28 in the display area 12 via the gate lines 20. Thus, the pixel switching elements 28 are set to an on-state. At this time, an image signal is supplied to the pixel electrodes 22 in an on-state via the data line drive circuit 55 and the multiplexer 53. As a result, the image signal is written to the pixel electrodes 22.

Thus, a fringe electric field is generated between the common electrodes 26 and the pixel electrodes 22 in an on-state. The optical property of the liquid crystal layer 5 is changed by the fringe electric field. In this way, an image is displayed in the pixel areas 27.

In the display period, the gate shift registers 52 vertically adjacent to each other are operated in order from the upper side. Thus, the pixel areas 27 in several tens to several hundreds of rows are scanned in a line-sequential system. In this way, an image is displayed in series.

After the display period (Display) ends, a sensor period (Touch) starts. In the sensor period (Touch) for detecting a touch, each row of common electrodes 26 is controlled so as to be in a sensing state for performing touch detection in series. FIG. 8 shows how the state of select switching elements 81b and 81a controlled by switch lines 79b and 79a is changed between ON and OFF when the $N^{th}$ row, the $N+1^{th}$ row, the $N+2^{th}$ row, the $N+3^{th}$ row, . . . , are controlled so as to be in a sensing state in series.

When the $N+1^{th}$ row is controlled so as to be in a sensing state (see period t11 shown in FIG. 8), select switching elements 81a are set to an on-state based on a switch signal (for example, a high switch signal) from switch line 79a, and select switching elements 81b are set to an off-state based on a switch signal (for example, a low switch signal) from switch line 79b. In this manner, the common electrodes 26 in the $N+1^{th}$ row are set as the sensor electrodes SE, and are supplied with a pulse signal from the pulse signal generation module 64 via the mirror circuit 65. At this time, the same signal as the pulse signal is input to the detection circuit 66 via the mirror circuit 65.

When a detection object O touches the display surface 11 facing the sensor electrodes SE, the pulse signal from the sensor signal generation module 64 is changed by the effect of the detection object O. The change in the pulse signal is input to the comparison device 67 of the detection circuit 66, is converted into digital data by the A/D converter 68, and is transmitted to the subsequent processing circuits.

In the sensor period (Touch), a pulse signal is supplied from the mirror circuit 65 to each third wiring 77a. In the rows other than the row of common electrodes 26 selected as the sensor electrodes SE (in other words, in the non-sensing rows), all of select switching elements 81a are set to an off-state (see the the $N^{th}$ row, the $N+2^{th}$ row and the $N+3^{th}$ row in FIG. 8). Thus, no pulse signal for sensing is supplied to the non-sensing rows.

The guard signal switches GSW are set to an on-state. Thus, a guard signal is supplied to third wirings 77b via the guard signal line GSL and the guard signal switches GSW. However, a guard signal is not supplied to the common electrodes 26 currently set to a sensing state since select switching elements 81b connected to the common electrodes 26 in a sensing state are set to an off-state. In the common electrodes 26 in the upper and lower non-sensing rows adjacent to the row of common electrodes 26 in a sensing state, select switching elements 81b are set to an on-state. Thus, a guard signal is supplied to the common electrodes 26 in the upper and lower non-sensing rows. Further, all of select switching elements 81b connected to the common electrodes 26 in the other non-sensing rows are set to an off-state. Thus, the common electrodes 26 in the other non-sensing rows are set to a floating state. In this way, power consumption is reduced in the rows in a floating state in comparison with the rows in a guard state.

As described above, while touch detection is performed by the sensor electrodes SE (common electrodes 26) in the sensing row, a guard signal is input from the guard signal generation module 75 to the common electrodes 26 in at least a pair of upper and lower non-sensing rows adjacent to the sensing row.

The guard signal is a pulse signal having the same waveform as that of the pulse signal generated by the sensor signal generation module 64.

Thus, the same signal as the sensor signal of the sensing circuit 61 is supplied to the common electrodes 26 in the above pair of non-sensing rows in a state where the common electrodes 26 are not connected to the sensing circuit 61. In this manner, generation of unnecessary capacitance is prevented as much as possible between the sensor electrodes SE and the common electrodes 26 in the pair of non-sensing rows. As described above, a guard signal may have a phase which is substantially the same as that of the pulse signal generated by the sensor signal generation module 64, and may have an amplitude slightly less than that of the pulse signal.

Touch detection by a self-capacitive system is performed by detecting change in the charge in connection with change in the capacitance of the sensor electrodes SE. The change in capacitance includes change in capacitance between the detection object O and the sensor electrodes SE necessary for touch detection as well as change in capacitance between the sensor electrodes SE and the other electrodes around the sensor electrodes SE unnecessary for touch detection. To solve this problem, as described above, a guard signal is input to the common electrodes 26 other than the sensor electrodes SE. Thus, generation of unnecessary change in capacitance can be prevented as much as possible. Further, it is possible to reduce the proportion of unnecessary change in capacitance in change in capacitance for touch detection. In this way, the detection circuit 66 is capable of receiving change in the capacitance of the sensor electrodes SE in a state where the proportion of change in capacitance caused by the detection object is increased. As a result, detection accuracy can be further improved.

The same pulse wave is written to sensor electrodes SE and the common electrodes 26 in the upper and lower non-sensing rows adjacent to the sensor electrodes SE at the same time. Thus, lines with equal electric force are formed from all the common electrodes 26 toward the upper side.

In general, lines of electric force have repulsion each other. In the present embodiment, it is possible to exert the effect of lines of electric force from the sensor electrodes SE on the upper side in comparison with when the guard signal having the same waveform as that of the sensor signal is not output by the common electrodes 26 around the sensor electrodes SE. In this manner, it is possible to detect a detection object O relatively far from the display surface 11. As a result, even when the sensor electrodes SE are apart from the detection object O by providing a glass cover, etc., over the liquid crystal display panel 2, detection accuracy is sufficiently maintained. Even when the sensor electrodes SE are provided on a deep side (on the backlight side) relative to the display surface 11, detection accuracy is sufficiently maintained. It is possible to detect a detection object O even when the detection object O is apart from the sensor electrodes SE such that the detection object O is not directly in contact with the sensor electrodes SE.

In the present embodiment, the display device 1 having a touch function comprises the select circuit 62 such that the specific common electrodes 26 are selected as sensor electrodes SE in each sensor period, and the sensor electrodes SE are connected to the sensing circuit 61. Thus, there is no need to provide the same number of detection circuits 66 as the number of common electrodes 26. The number of detection circuits 66 may be less than the number of common electrodes 26. As a result, it is possible to flexibly deal with increase in the number of common electrodes 26 in connection with realization of high-accuracy touch detection or with increase in the size of the display area 12. Moreover, it is possible to flexibly respond to reduction in the size of frame, in other words, reduction in the width of the non-display area 13.

Switch portions 78 which switch the state of connection between the common electrodes 26 and the sensing circuit 61 are provided in the display area 12. In this manner, it is possible to prevent expansion of the non-display area 13 caused by the presence of the switch portions 78. Since the switch portions 78 are formed in the normal steps for forming the display area 12, it is possible to prevent increase in the number of manufacturing steps in connection with formation of the switch portions 78.

Figure 9:
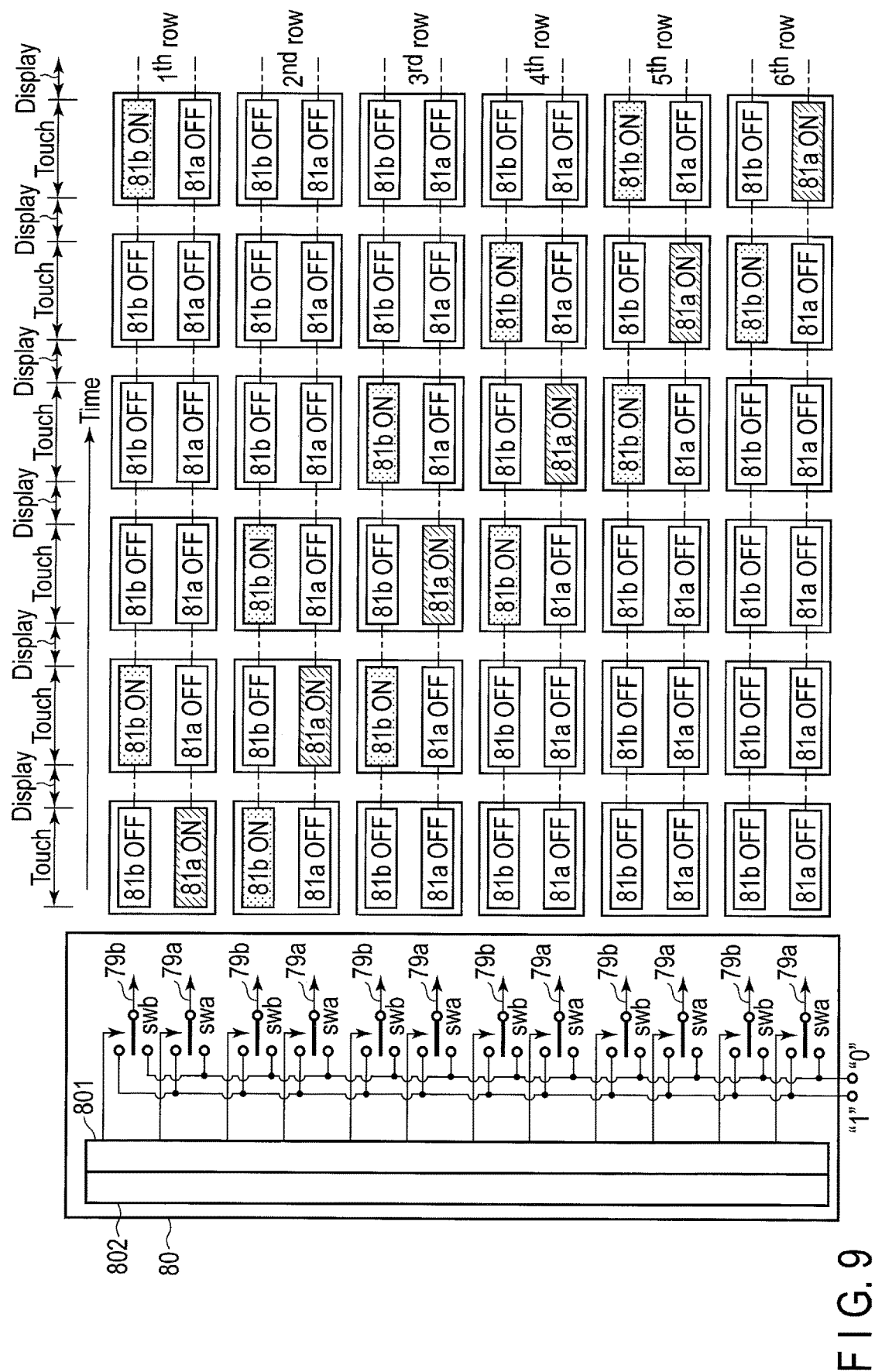
FIG. 9 is shown for explaining the general structure and operation of a switch drive circuit usable in the first embodiment.

FIG. 9 is shown for explaining a structural example and an operation of the switch line drive circuit 80 used in the display device 1 of the first embodiment. The switch line drive circuit 80 comprises switches swb and swa for outputting a switch signal to switch lines 79*b* and 79*a*, respectively.

Switches swb and swa are capable of selecting a switch signal of logic "1" or logic "0" and outputting it in accordance with a control signal alternately supplied based on the touch period. In accordance with the switch signal, select switching elements 81*b* and 81*a* connected to each common electrode 26 are controlled so as to be in an on-state or off-state in each touch period.

The operation state of each common electrode 26 is set to a sensing state or a non-sensing state (including a guard state and a floating state) based on the state of select switching elements 81*b* and 81*a* and the state of the guard signal switch GSW explained earlier in a touch period (Touch). Each common electrode in which select switching elements 81*b* and 81*a* are shown as OFF and ON, respectively, is in a sensing state. Each common electrode in which select switching elements 81*b* and 81*a* are shown as ON and OFF, respectively, is in a guard state. Each common electrode in which select switching elements 81*b* and 81*a* are shown as OFF and OFF, respectively, is in a floating state.

In order to make the description clearer, FIG. 9 shows six rows each including a plurality of common electrodes and assumes the six rows as one frame. FIG. 9 shows that the state of the common electrodes 26 in each row is changed among three states, specifically, a sensing state, a guard state and a floating state, based on the touch period (Touch) as time passes. To realize this change, switches swb and swa select a switch signal of logic "1" or a switch signal of logic "0" in each touch period in accordance with a control signal from register 801 or 802. When a first control signal is output from register 801 in a first touch period (Touch), a second control signal necessary for the next second touch period (Touch) is prepared in register 802. When the second control signal is output from register 802 in the second touch period (Touch), a third control signal necessary for the next third touch period (Touch) is prepared in register 801. In this manner, the sensing row is changed (scanned) in order.

Second Embodiment

FIG. 10 shows a second embodiment. The same elements as those of FIG. 6B are denoted by the same reference numbers. In the present embodiment, third wirings 77*b* and switch lines 79*b* are deleted from the embodiment shown in FIG. 6B. Each third wiring 77*a* is connectable to a common voltage line CVL via a common voltage switch CSW. This connection is controlled so as to be off or on by a switch control signal SW1 from a timing controller 57. Each third wiring 77*a* is connectable to a sensing circuit 61 via a drive switch DSW. The drive switch DSW is controlled so as to be in an off-state or on-state by a switch control signal xSW1 from the timing controller 57.

Figure 11:
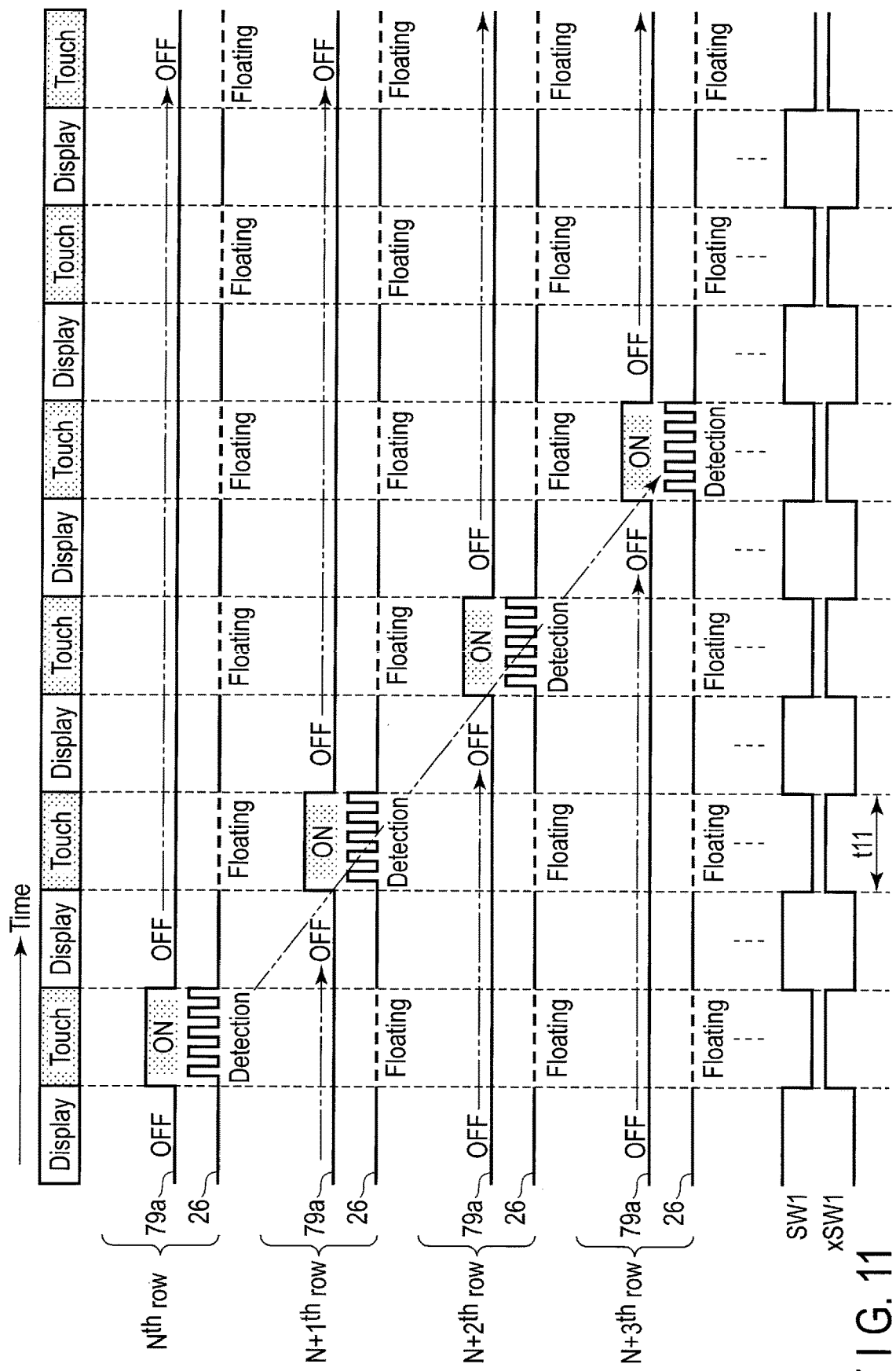
FIG. 11 is a timing chart shown for explaining the sequence of driving common electrodes in the liquid crystal display device having a touch function according to the second embodiment.

FIG. 11 is a timing chart shown for explaining the operation of the embodiment of FIG. 10. In the present embodiment, each third wiring 77*a* is connected to the common voltage line CVL via the common voltage switch SCW in a display period (Display). Thus, each sensor electrode SE functions as a common electrode 26 and contributes to display in a display period (Display).

In a touch period (Touch), each third wiring 77*a* is connected to the sensing circuit 61 via the drive switch DSW. Only a switch signal from switch line 79*a* in a predetermined row (in the example of FIG. 10, sensing row 26AL) is, for example, high. Thus, corresponding switching elements 81*a* are set to an on-state, and the sensor electrodes SE in row 26AL are set to a sensing state. At this time, a switch signal from switch lines 79*a* in the other rows (non-sensing rows) is low. Thus, corresponding switching elements 81*a* are set to an off-state, and all of corresponding sensor electrodes SE are set to a floating state.

Figure 12:
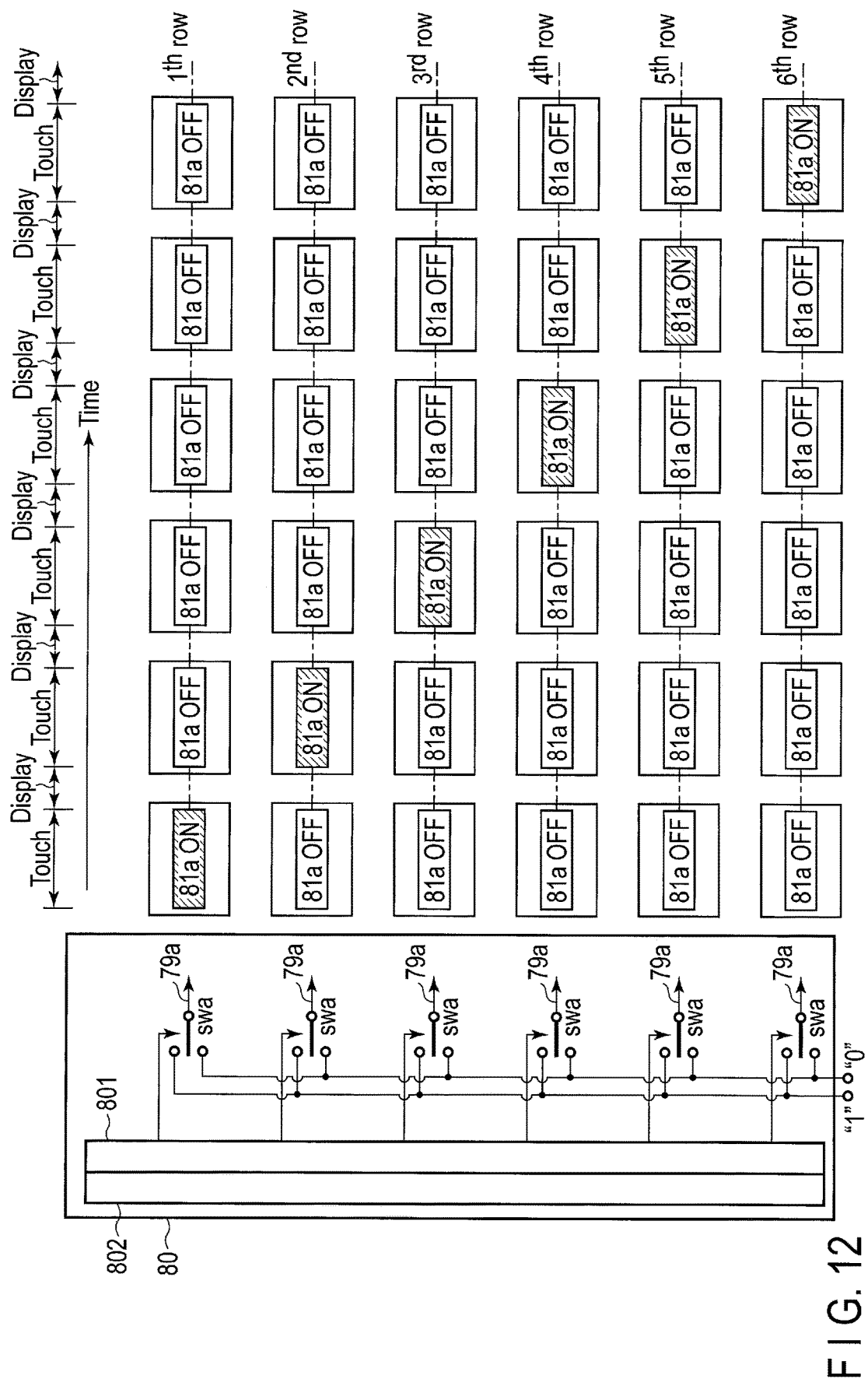
FIG. 12 is shown for explaining an example of the general structure and operation of a switch drive circuit usable in the second embodiment.

FIG. 12 is shown for explaining a structural example and an operation of a switch line drive circuit 80 used in a display device 1 according to the second embodiment. Switch swa is capable of selecting a switch signal of logic "1" or logic "0" and outputting it in accordance with, for example, a control signal alternately supplied based on the frame period from registers 801 and 802. In accordance with the switch signal, select switching elements 81*a* and 81*b* connected to each common electrode 26 are controlled so as to be in an on-state or off-state in each touch period.

The operation state of each common electrode 26 is set to a sensing state or a floating state by the state of switch 81*a* and the drive switch DSW explained in FIG. 9 in a touch period (Touch).

In order to make the description clearer, FIG. 12 shows six rows each including a plurality of common electrodes and assumes the six rows as one frame. FIG. 12 shows that the state of the common electrodes 26 in each row is changed between a sensing state and a floating state based on the touch period (Touch) as time passes. To realize this change, switch swa selects a switch signal of logic "1" or a switch signal of logic "0" in each touch period in accordance with a control signal from register 801 or 802. When a first control signal is output from register 801 in a first touch period (Touch), a second control signal necessary for the next second touch period (Touch) is prepared in register 802. When the second control signal is output from register 802 in the second touch period (Touch), a third control signal necessary for the next third touch period (Touch) is prepared in register 801. In this manner, the sensing row is changed (scanned) in order.

In the above embodiment, the common electrodes 26 in the rows excluding the sensing row in a sensing state are set to a floating state. Thus, it is possible to prevent generation of capacitance between the sensor electrodes SE in the sensing row and the common electrodes 26 in the upper and lower non-sensing rows adjacent to the sensor electrodes SE in comparison with a case where the common electrodes 26 in the non-sensing rows are always maintained at constant voltage. In the present embodiment, only switching elements 81*a* in the sensing row are set to an on-state, and all of switching elements 81*a* in the other non-sensing rows are set to an off-state. Thus, power consumption can be reduced. In addition, since a guard signal is not used, power consumption can be reduced in comparison with the previous embodiment. In the second embodiment, switch lines 79b are unnecessary. The number of pixel areas having a less opening rate can be decreased.

Third Embodiment

FIG. 13 is a plan view schematically showing a part of a liquid crystal display device 1 having a touch function according to a third embodiment. The display device 1 having a touch detection function is different from that of the first embodiment in terms of the structure of connection between switch lines 79a and 79b and each common electrode 26, a switch line drive circuit 80, etc. However, the other structures are the same as those of the first embodiment (FIG. 6B). Thus, the same structures as those of the first embodiment are denoted by the same reference numbers, descriptions thereof being omitted.

As show in FIG. 13, in the present embodiment, a pair of switch lines 79a adjacent to each other in a second direction Y is connected to each other. A pair of switch lines 79b adjacent to each other in the second direction Y is also connected to each other. More specifically, an end portion of switch line 79a extends from the switch line drive circuit 80 to a non-display area 13 via a first row in a display area, and returns to the display area on the switch line drive circuit 80 side via a second row in the display area. Each switch line is connected to the switch portions provided in the common electrodes.

In the present embodiment, in each sensor period, the common electrodes 26 in two rows connected to each other can be collectively selected as sensor electrodes SE. Thus, the total sensor period can be reduced by half.

In the present embodiment, a structure of connecting two switch lines 79 adjacent to each other is employed. However, a structure of connecting three or more switch lines 79 may be employed.

Fourth Embodiment

FIG. 14 is a plan view schematically showing a part of a liquid crystal display device 1 having a touch function according to a fourth embodiment. The display device 1 having a touch detection function is different from that of the first embodiment in terms of the structure of connection between switch lines 79a and common electrodes 26, a switch line drive circuit 80, etc. However, the other structures are the same as those of the second embodiment (FIG. 10). Thus, the same structures as those of the second embodiment are denoted by the same reference numbers, descriptions thereof being omitted.

As shown in FIG. 14, in the present embodiment, a pair of switch lines 79a adjacent to each other in a second direction Y is connected to each other. More specifically, an end portion of switch line 79a extends from the switch line drive circuit 80 to a non-display area 13 via a first row in a display area, and returns to the display area on the switch line drive circuit 80 side via a second row in the display area. Each switch line is connected to switch portions 81a provided in the common electrodes.

In the present embodiment, similarly, in each sensor period, the common electrodes 26 in two rows connected to each other can be collectively selected as sensor electrodes SE. Thus, the total sensor period can be reduced by half. In the present embodiment, a structure of connecting two switch lines 79a adjacent to each other is employed. However, a structure of connecting three or more switch lines 79a may be employed.

Fifth Embodiment

Figure 15:
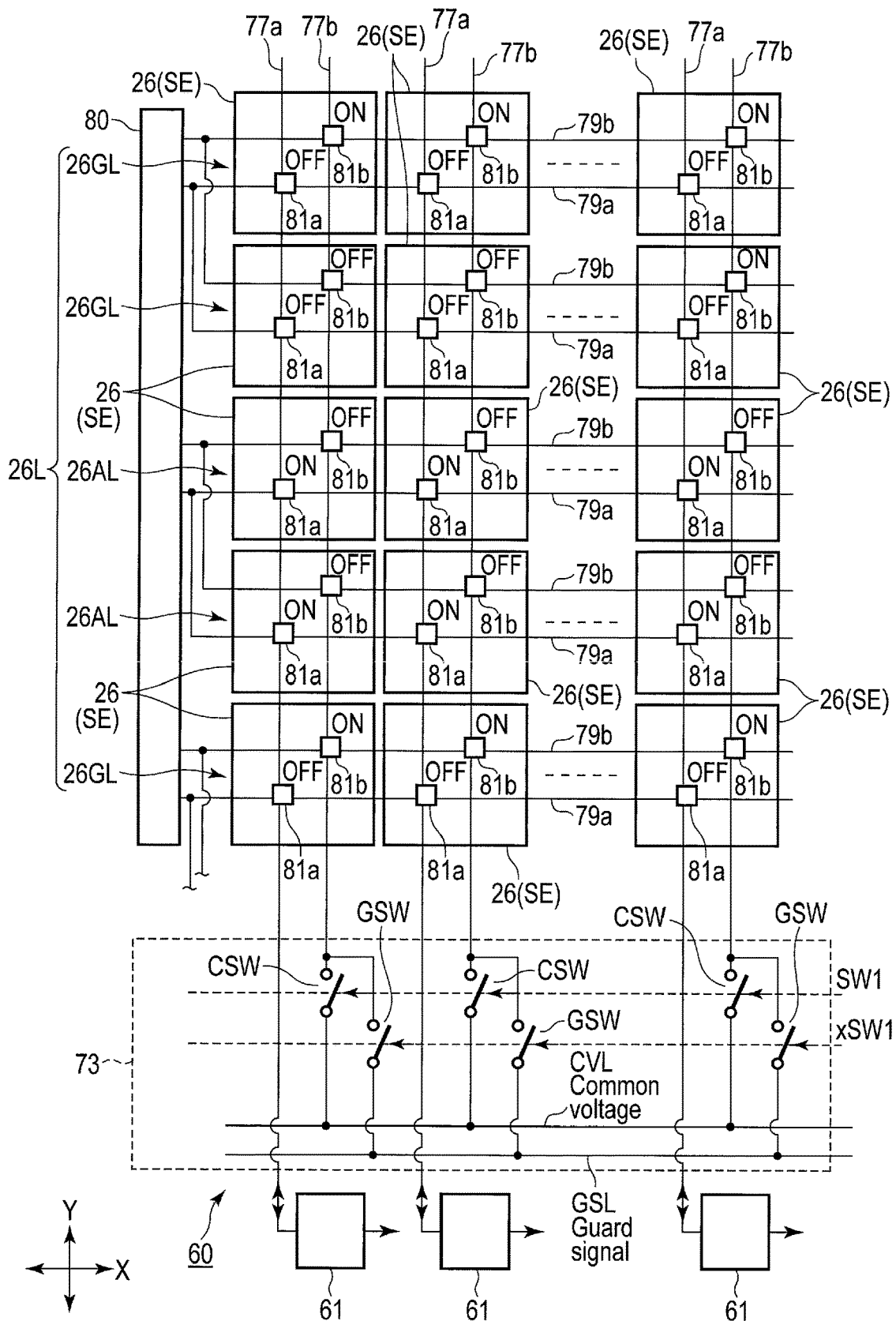
FIG. 15 is a plan view schematically showing the circuit structure of another modification example of the liquid crystal display device having a touch function according to the first embodiment.

FIG. 15 is a plan view schematically showing a part of a liquid crystal display device 1 having a touch function according to a fifth embodiment. The display device 1 having a touch detection function is different from that of the first embodiment in terms of the structure of connection between switch lines 79a and 79b and common electrodes 26, a switch line drive circuit 80, etc. However, the other structures are the same as those of the first embodiment (FIG. 6B). Thus, the same structures as those of the first embodiment are denoted by the same reference numbers, descriptions thereof being omitted.

As show in FIG. 15, in the display device 1 of the present embodiment, a first output terminal from the switch line drive circuit 80 is connected to switch lines 79a and 79a of adjacent rows (first and second rows) of common electrodes 26. In the same manner, a second output terminal from the switch line drive circuit 80 is connected to switch lines 79b and 79b of adjacent rows (first and second rows) of common electrodes 26.

In the present embodiment, similarly, in each sensor period, the common electrodes 26 in two rows connected to each other can be collectively selected as sensor electrodes SE. Thus, the total sensor period can be reduced by half. In the present embodiment, a structure of connecting two switch lines 79a adjacent to each other is employed. However, a structure of connecting three or more switch lines 79a may be employed.

Sixth Embodiment

Figure 16:
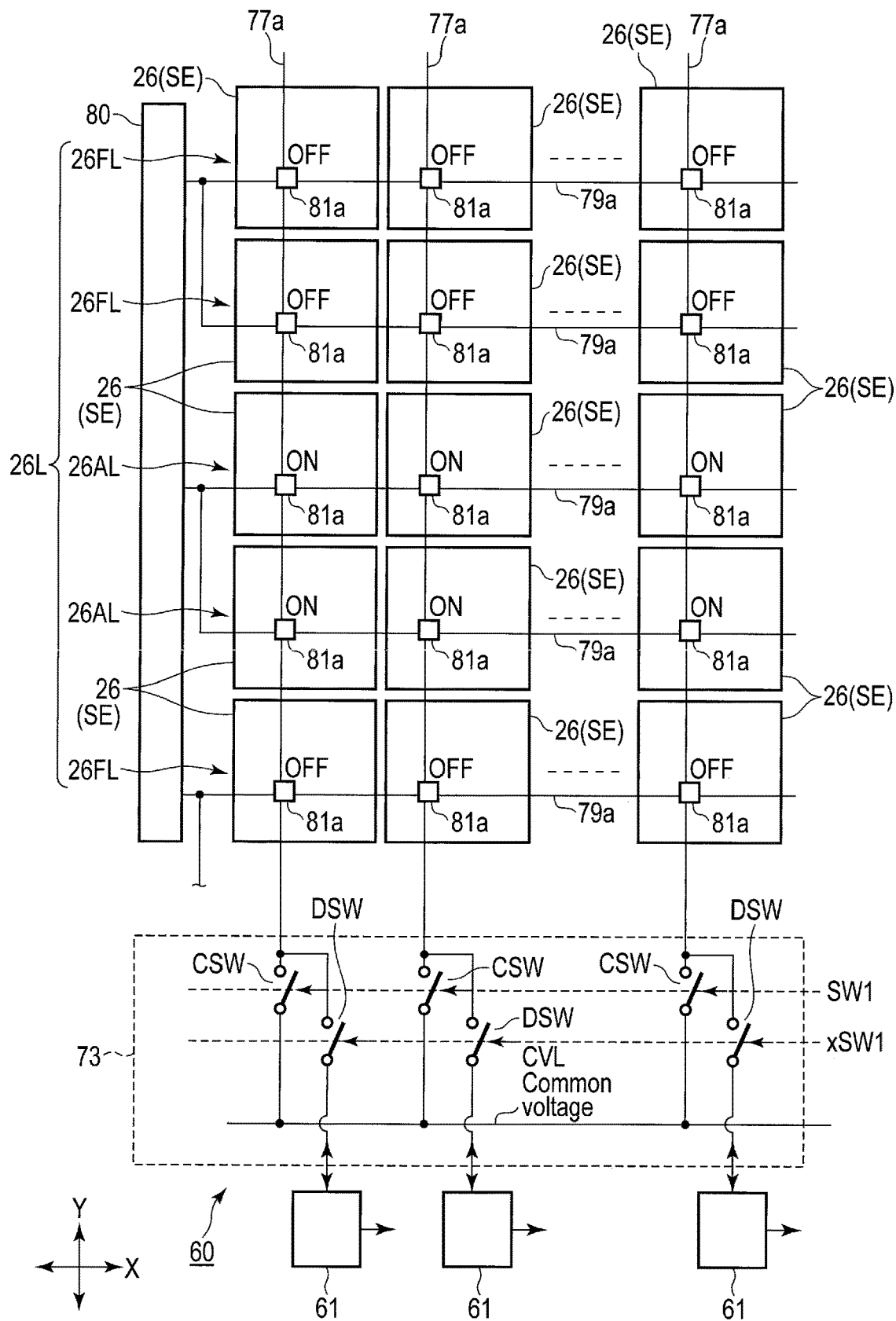
FIG. 16 is a plan view schematically showing the circuit structure of another modification example of the liquid crystal display device having a touch function according to the second embodiment.

FIG. 16 is a plan view schematically showing a part of a liquid crystal display device 1 having a touch function according to a sixth embodiment. The display device 1 having a touch detection function is different from that of the second embodiment in terms of the structure of connection between switch lines 79a and common electrodes 26, a switch line drive circuit 80, etc. However, the other structures are the same as those of the second embodiment (FIG. 10). Thus, the same structures as those of the second embodiment are denoted by the same reference numbers, descriptions thereof being omitted.

As shown in FIG. 16, in the display device 1 of the present embodiment, a first output terminal from the switch line drive circuit 80 is connected to switch lines 79a and 79a of adjacent rows (first and second rows) of common electrodes 26.

In the present embodiment, similarly, in each sensor period, the common electrodes 26 in two rows connected to each other can be collectively selected as sensor electrodes SE. Thus, the total sensor period can be reduced by half. In the present embodiment, a structure of connecting two switch lines 79a adjacent to each other is employed. However, a structure of connecting three or more switch lines 79a may be employed.

In FIG. 6B, FIG. 7, FIG. 10 and FIG. 13 to FIG. 16, the structural elements related to display are omitted such that the sensor function can be easily understood. However, the actual device comprises the structural elements necessary for display as explained in FIG. 3 and FIG. 6A.

Figure 17:
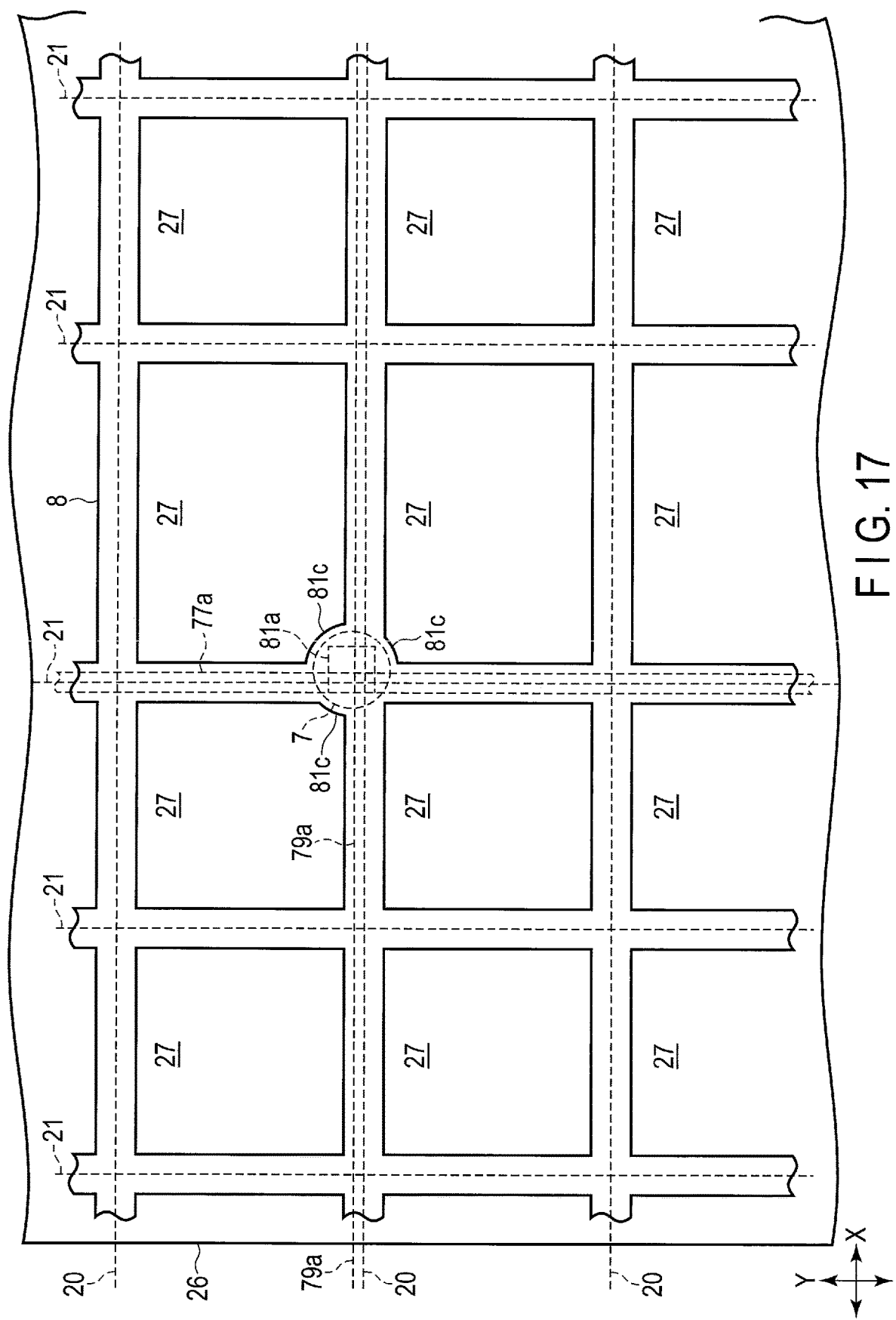
FIG. 17 is an enlarged plan view schematically showing a part of structural examples of a black matrix 8 and a shielding portion 9 usable in each of the above embodiments.

Now, this specification explains structural examples of the black matrix 8 and a shielding portion 9 usable in each of the above embodiments with reference to FIG. 17. In the display device 1 having a touch detection function, the structures on the first substrate 3 side are the same as those of the first embodiment. Thus, the same structures as those of the first embodiment are denoted by the same reference numbers, descriptions thereof being omitted. Regarding the second substrate 4, the black matrix 8 is extracted, the entire part of the second substrate 4 being omitted.

As shown in FIG. 17, in the present embodiment, the spacer 7 is provided at a position overlapping select switching element 81a in a plan view.

The black matrix 8 is provided on the second substrate 4. The black matrix 8 is provided at positions overlapping each switch line 79a, each gate line 20, each data line 21, etc., in order to shield them against light. Thus, the black matrix 8 has the shape of a lattice. The black matrix 8 comprises the shielding portion 9 at a position corresponding to the spacer 7. The shielding portion 9 corresponding to the spacer 7 is slightly larger than the spacer 7.

In the present embodiment, the select switching element 81 overlaps the spacer 7. The spacer 7 is covered by the shielding portion 9 of the black matrix 8. Thus, the select switching element 81 is also shielded by the black matrix 8 against light. As a result, the visibility of the select switching element 81 is reduced although the select switching element 81 is provided in the display area 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the present embodiment, all of the common electrodes 26 arranged in matrix are connected to the select circuit 62 such that each common electrode 26 can be selected as a sensor electrode SE. However, the select circuit 62 may not be provided in one or some of the common electrodes 26 such that the common electrodes 26 which do not comprise the select circuit 62 cannot be selected as sensor electrodes SE.

In the above embodiments, only the common electrodes 26 in one row are selected as the sensor electrodes SE in each sensor period. However, the common electrodes in a plurality of rows or all of the rows may be selected as the sensor electrodes SE in series in each sensor period.

In the above embodiments, as the display device 1 and a method of driving the display device 1, this specification exemplarily discloses a liquid crystal display device 1 and a method of driving the liquid crystal display device. However, as the display device 1 of each embodiment, various flat panel display devices 1 can be considered. For example, an organic electro-luminescent display device 1, a different self-luminous display device 1, and an electronic paper display device 1 having an electrophoresis element can be considered. As a matter of course, the above embodiments may be applied to small, medium-sized or large display devices without particular limitation.

What is claimed is:

1. A display device comprising:
a plurality of gate lines;
a plurality of data lines intersecting with the gate lines;
a plurality of pixel electrodes located in areas defined by the gate lines and the data lines, at least one of the pixel electrodes being connected to one of the signal lines via a pixel switching element;
a plurality of common electrodes opposed to the pixel electrodes; and
a third wiring connected to one of the common electrodes via a select switching element.

2. The display device of claim 1, wherein
the pixel switching element and the select switching element are located in one of the areas.

3. The display device of claim 1, wherein
the pixel switching element has a semiconductor portion and the select switching element has a semiconductor portion, and both of the semiconductor portions are in the same layer.

4. The display device of claim 1, further comprising:
another third wiring connected to the common electrode via another select switching element.

5. The display device of claim 1, further comprising:
a common voltage generation circuit that supplies a common voltage, and
a common voltage switch connecting the common voltage generation circuit to the third wiring, wherein
when the pixel switching element is in an on-state,
the select switching element is in an on-state, and
the common voltage switch is in an on-state, and
when the pixel switching element is in an off-state,
the select switching element is in the on-state and
the common voltage switch is in an off-state,
or
the select switching element is in an off-state.

6. The display device of claim 5, further comprising:
a guard signal line that is supplied with a guard signal, and
a guard signal switch connecting the guard signal line to the third wiring, wherein
when the pixel switching element is in the on-state,
the select switching element is in the on-state,
the common voltage switch is in the on-state, and
the guard signal switch is in an off-state, and
when the pixel switching element is in the off-state,
the select switching element is in the on-state
the common voltage switch is in the off-state, and
the guard signal switch is in an on-state,
or
the select switching element is in the off-state.

7. The display device of claim 6, further comprising:
a sensing circuit connected to another third wiring via another select switching element, wherein
when the pixel switching element is in the on-state,
the select switching element is in the on-state,
the common voltage switch is in the on-state,
the guard signal switch is in the off-state, and
the another select switching element is in an off-state, and
when the pixel switching element is in the off-state,
the select switching element is in the on-state,
the common voltage switch is in the off-state,
the guard signal switch is in the on-state, and
the another select switching element is in the off-state,
or
the select switching element is in the off-state, and
the another select switching element is in the off-state,
or
the select switching element is in the off-state, and
the another select switching element is in an on-state.

8. The display device of claim 5, further comprising:
a sensing circuit connected to another third wiring via another select switching element, wherein when the pixel switching element is in the on-state,
the select switching element is in the on-state,
the common voltage switch is in the on-state, and
the another select switching element is in an off-state, and when the pixel switching element is in the off-state,
the select switching element is in the on-state,
the common voltage switch is in the off-state, and
the another select switching element is in the off-state, or
the select switching element is in the off-state, and
the another select switching element is in the off-state, or
the select switching element is in the off-state, and
the another select switching element is in an on-state.

\* \* \* \* \*